(12) United States Patent
Hertz et al.

(10) Patent No.: US 7,529,597 B1
(45) Date of Patent: May 5, 2009

(54) AUTOMATED NEWS RACK INVENTORY AND ALERT MANAGEMENT SYSTEM

(76) Inventors: Kim Marie Hertz, 12784 Tulipwood Cir., Boca Raton, FL (US) 33428; Allen David Hertz, 12784 Tulipwood Cir., Boca Raton, FL (US) 33428

(\*) Notice: Subject to any disclaimer, the term of this patent is extended or adjusted under 35 U.S.C. 154(b) by 148 days.

(21) Appl. No.: 11/324,568

(22) Filed: Jan. 3, 2006

Related U.S. Application Data

(63) Continuation-in-part of application No. 10/842,728, filed on May 10, 2004, now Pat. No. 7,184,857, which is a continuation-in-part of application No. 10/335,042, filed on Dec. 31, 2002, now Pat. No. 6,735,498, which is a continuation-in-part of application No. 10/086,577, filed on Feb. 28, 2002, now Pat. No. 6,502,012, application No. 11/324,568, which is a continuation-in-part of application No. 10/754,998, filed on Jan. 10, 2004, now abandoned.

(51) Int. Cl.
*G06F 17/00* (2006.01)
(52) U.S. Cl. .................. 700/241; 700/236; 700/242
(58) Field of Classification Search ................. 700/236, 700/241, 242
See application file for complete search history.

(56) References Cited

U.S. PATENT DOCUMENTS

| | | | |
|---|---|---|---|
| 5,091,713 A | 2/1992 | Horne et al. | |
| 5,205,436 A * | 4/1993 | Savage | 700/237 |
| 5,207,784 A | 5/1993 | Schwartzendruber | |
| 5,415,264 A * | 5/1995 | Menoud | 700/236 |
| 5,450,938 A | 9/1995 | Rademacher | |
| 5,791,511 A * | 8/1998 | Lowing | 221/6 |
| 5,845,577 A | 12/1998 | Nelson et al. | |
| 5,860,362 A * | 1/1999 | Smith | 700/235 |
| 5,918,213 A * | 6/1999 | Bernard et al. | 705/26 |
| 5,947,328 A | 9/1999 | Kovens et al. | |
| 6,038,491 A | 3/2000 | McGarry et al. | |
| 6,152,365 A | 11/2000 | Kolls | |
| 6,193,154 B1 | 2/2001 | Phillips et al. | |
| 6,227,972 B1 | 5/2001 | Walker et al. | |
| 6,230,150 B1 | 5/2001 | Walker et al. | |
| 6,279,684 B1 | 8/2001 | Lewis | |
| 6,295,482 B1 | 9/2001 | Tognazzini | |
| 6,532,368 B1 * | 3/2003 | Hild et al. | 455/515 |

\* cited by examiner

*Primary Examiner*—Gene Crawford
*Assistant Examiner*—Timothy R Waggoner
(74) *Attorney, Agent, or Firm*—Allen D. Hertz

(57) ABSTRACT

The present invention describes various methods and apparatus to increase efficiency and sales of a Newspaper Rack. Newspaper Racks are generally placed within a close proximity to each other, and generally less than ½ mile apart providing the unique ability to create a local network. With hardware and monthly operation costs are critical within the industry, the present invention utilizes local network(s) which transmits information to a collector. The local network(s) can be a star network, a mesh network, or a trunking network. The collector uploads the information via any of a number of longer-range transmission methods, including cellular, paging, Wi-Fi, Internet, dial-up modem, and others. Using a local network shares the upload costs, drastically reducing the operating costs for the Newspaper Company. Because the Newspaper Racks are deployed throughout a region, it is convenient to utilize the local network created by the Newspaper Rack monitoring system to additionally monitor other objects. This cost effective network can be utilized for monitoring other objects that are not within range for a local network, by networking unlike objects together.

19 Claims, 19 Drawing Sheets

AUTOMATED NEWS RACK INVENTORY AND ALERT MANAGEMENT SYSTEM

RELATED US APPLICATION DATA

This patent application claims priority to CIP Utility application Ser. No. 10/754,998 filed on Jan. 10, 2004 now abandoned and the following family of applications: CIP Utility application Ser. No. 10/842,728 filed on May 10, 2004 now U.S. Pat. No. 7,184,857, which claims priority to CIP Utility patent application Ser. No. 10/335,042 Filed Dec. 31, 2002, now issued U.S. Pat. No. 6,735,498 which claims priority to CIP Utility patent application Ser. No. 10/086,577 Filed Feb. 28, 2002, now issued U.S. Pat. No. 6,502,012 which claims priority to patent application Ser. No. 09/563,622 Filed May 5, 2000, now issued U.S. Pat. No. 6,397,126 which was claims priority to Provisional Patent Application 60/133,656 filed May 11, 1999, all of which are incorporated by reference herein.

FIELD Of The INVENTION

This invention relates in general to a method for an automated inventory monitoring system for a News Rack using wireless transmitters, the internet, wired and wireless receiving devices, and other automated notification means.

BACKGROUND OF THE INVENTION

The present invention is generally related to the use of a remote, automated apparatus for monitoring of inventory of News Racks. News Racks are unique in that they are generally located where it would not be conducive to provide utilities such as power or telephone. News Racks further utilize an honor system for purchases, whereby a consumer would insert change into a payment mechanism, the payment mechanism would allow the access door to open, and the consumer would honorably withdraw a single copy of the Newspaper.

News Racks do not normally distribute change. They do not have sensors. They normally do not support portable power such as batteries.

News Racks are desired to be manufactured of low cost materials and able to withstand harsh environments, including extreme variances in temperatures, extreme variances in humidity, salt spray (for corrosion), physical abuse, and the like.

The Newspaper companies print a predetermined quantity of Newspapers referred to as a draw. The draw is then distributed to the fleet of News Racks. The Single Copy Sales Manager uses very limited information to assist in the distribution process. Newsprint is generally the second largest cost to the Newspaper Company; the first is generally salaries. The goal is to optimize sales while minimizing the excess number of Newspapers that are printed.

It is desirable for the Single Copy Sales Manager to obtain verification that each News Rack is filled and the time in which each News Rack is filled as well as when the inventory of each of the News Racks is depleted. This can aid in the distribution of the draw and further re-distribution of the draw upon depletion of the inventory. This will result in optimizing profits.

One currently used method of identifying when the inventory is depleted within a News Rack is by employing someone to travel about inspecting the various News Racks, whereby that person reports any News Racks with depleted inventory. One flaw in this scenario is where the person passes a News Rack then the last Newspaper is purchased. At best, there is a time delay before the News Rack is identified as empty, at worst case, the News Rack is never identified as empty.

News Racks are normally located adjacent similar News Racks of competing companies. The optimal sales period for Newspapers is generally considered between 6 AM and 1 PM. Should the inventory of a News Rack become depleted prior to the end of the optimal time period, it would be desirable to replenish the inventory of Newspapers within the News Racks. This minimizes the risk of a Customer purchasing a competing Newspaper.

A majority of the revenue for a Newspaper company is from advertisements. Advertisements require distribution of the printed media. When the News Racks are empty, the process is no longer able to distribute the media or provide the desired advertisements. The ability to ensure the advertisements are available to the consumer enhances the value of the advertisement process and cost to the advertiser.

News Racks are located in a multitude of locations. The multitude of locations provides the ability to monitor weather, persons, traffic, and the like proximate the location of the News Racks.

Other sales means for Newspapers include shelf sales systems located in convenience stores, supermarkets and the like. This means of presentation also fails to provide inventory information to the Newspaper Company.

Single paper distribution racks are known.

It would be desirable for a Single Copy Sales Manager to obtain demographics pertaining to the deployed number of News Racks in order to predict an optimal distribution pattern.

News Racks occasionally falter when the customer inserts change and the News Rack fails to open. News Racks do not provide change. At times, customers do not recognize this limitation of the News Racks; therefore the customers request a refund. The cost of processing a refund can be as high as $5 per occasion, much higher than the average $0.50 per Newspaper.

Selective call receivers, such as paging devices, wireless personal data assistants, cell phones, and the like, are known to remotely control devices such as lawn sprinkling systems for golf courses.

Selective call receivers, such as paging devices, wireless personal data assistants, cell phones, and the like, are known to have two way signal transmission capabilities.

Newspaper dispensers are preferred to be low cost, free standing, and located in remote locations. Additionally, the newspaper dispensers are generally placed at locations that are not conducive to wired facilities, such as power, communications, and the like.

Newspapers have a shelf life of News Rack access door transparent viewing panel 24 hours, thus increasing the need for inventory control. Excess inventory must be scrapped; shortages limit the potential sales.

Automated dispensing or vending machines are known.

Signal transmissions or other means to interface between two electronic circuits are known.

Global Positioning Systems are known.

What is desired is a method and apparatus to provide the Newspaper companies with a means to provide data collection in real time.

The use of a cellular or paging network incurs a monthly fee from the respective service provider. Although said monthly fees are generally low for each individual unit, when multiplied by higher quantities, this fee becomes a critical factor in a business decision. Newspaper companies can have 10K-25K racks in one region. A monthly service fee of only $3.00 per unit can be absorbed with a small number of racks, such as 1K-$3K per month. Consider the company that has 25K racks deployed. With the same $3.00 monthly fee, that would result in an incurred expense of $75K monthly which would be a deterrent. What would be desirable would be a lower cost per unit.

Newspaper companies are in need of alternative income sources to supplement lower circulation numbers as well as broadening advertising space, such as the Internet. What is desirable is to provide a means for additional revenue to the newspaper companies.

SUMMARY OF THE INVENTION

The present invention addresses the deficiencies in the present state of optimizing Newspaper Sales, including monitoring inventory, providing capabilities to pay via credit card, debit card, and other via a remote payment system, providing visual and audible signals to influence consumers, and changing sales prices.

A first aspect to the present invention is the ability to monitor a News Rack and identify when the News Rack is filled.

A second aspect to the present invention is the ability to monitor a News Rack and identify when the inventory of the News Rack is depleted.

A third aspect of the present invention is the ability to transmit a signal from a News Rack to identify when the inventory of the News Rack is filled or depleted.

A forth aspect of the present invention is the ability to receive the transmitted signal, determine the location of the rack.

A fifth aspect of the present invention is the ability to identify the time in which the signal is transmitted or received.

A sixth aspect to the present invention is the ability to further transfer the information received via the internet to electronically transfer and record any desirable information.

A seventh aspect to the present invention is the ability to monitor a News Rack for any unwarranted motion, such as vandalism. One such means would be a mercury switch. A second such means is a tilt switch such as ones provided by Comus International.

An eighth aspect of the present invention is the ability to monitor external activities such as traffic, weather, and the like using sensors proximate the News Rack.

A ninth aspect of the present invention is the ability to transfer information to a News Rack to change the price of the Newspaper.

A tenth aspect of the present invention is the inclusion of an LED, LCD display and the like and the respective circuitry to visually attract consumers.

An eleventh aspect of the present invention is the inclusion of a speaker and respective circuitry to record and play an audible message to attract consumers.

A twelfth aspect of the present invention is the ability to transfer a message to a News Rack to attract consumers, whereby some examples would be to flash a specific headline across an LED, LCD or other means of display to visually attract consumers, a sound transmission to audibly transmit a signal to attract consumers, and the like.

A thirteenth aspect of the present invention is the inclusion of solar power panels for power sourcing and optionally recharging of batteries.

A fourteenth aspect of the present invention is the inclusion of a charging system that utilizes the process of opening and closing the access door on a News Rack to power the charging system.

A fifteenth aspect of the present invention is the inclusion of a means to identify when a newspaper is placed within a door of a News Rack.

A sixteenth aspect of the present invention is the inclusion of an electromechanical switch, magnetic switch, proximity switch, and the like to identify when a newspaper is placed within the door of a News Rack.

A seventeenth aspect of the present invention is the inclusion of a means to identify when a newspaper is placed upon a platform within a News Rack.

An eighteenth aspect of the present invention is the inclusion of an electromechanical switch to identify when a newspaper is placed upon the platform of a News Rack.

A nineteenth aspect of the present invention is the inclusion of an adjustable platform, whereby the present invention includes a means to identify when the adjustable platform moves respective to a predetermined position within the News Rack.

A twentieth aspect of the present invention is a News Rack that includes a battery holder positioned on the underside of a platform.

A twenty-first aspect of the present invention is a News Rack that includes a battery holder whereby the battery contains two terminals located at one end and whereby when the battery is inserted into the battery holder, the two battery terminals make electrical connectivity with two respective receiving battery contacts.

A twenty-second aspect of the present invention is the inclusion of a means that a service person can cause the system to transmit a signal identifying a service completion.

A twenty-third aspect of the present invention is the use of a remote means to change the price of respective goods.

A twenty-forth aspect of the present invention is the ability to monitor the inventory of a News Rack whereby the News Rack is a shelf, rack, and the like positioned proximate a sales counter for retail sales. The shelf, rack, and the like, does not automatically sell or use the honor system to sell newspapers.

A twenty-fifth aspect of the present invention is the ability to monitor the status of the battery.

A twenty-sixth aspect of the present invention is the inclusion of a switch that is activated by the door, wherein the switch can be used to turn the sensor on, thus conserving power.

A twenty-seventh aspect of the present invention is the inclusion of a global positioning system to monitor the location of the News Rack.

A twenty-eighth aspect of the present invention is the inclusion of a circuit that activates the global positioning system upon an abnormal motion, wherein the abnormal motion would suggest vandalism or theft of the News Rack. (Generally in conjunction with aspect seven)

A twenty-ninth aspect of the present invention is the inclusion of an inventory sensor that monitors the inventory of a single copy newspaper distribution rack.

A thirtieth aspect of the present invention is the positioning of the inventory sensor proximate a presentation mechanism of the single copy newspaper distribution rack, wherein the presentation mechanism dispenses the single copy of the newspaper to the customer.

A thirty-first aspect of the present invention is the positioning of the inventory sensor proximate an indexing mechanism of the single copy newspaper distribution rack, wherein the indexing mechanism pushes the single copy of the newspaper towards the dispenser.

A thirty-second aspect of the present invention is a self contained, inventory monitoring system that contains all required components to be portable, whereby the system can be installed into a first News Rack, removed and re-installed into a second News Rack without excessive effort.

A thirty-third aspect of the present invention is the inclusion of a processing unit which provides the steps of turning the transmitter off, monitoring the respective sensors, upon change in any of the sensors—turning on the transmitter, monitoring the transmitter for synchronization or handshaking, communicating with the transmitter, and transmitting the respective message.

A thirty-fourth aspect of the present invention is the inclusion of a switch cover plate.

A thirty-fifth aspect of the present invention is whereby the switch cover plate is curved to limit any potential adverse buckling or bending.

A thirty-sixth aspect of the present invention is whereby the curved switch cover plate is mounted wherein the center of the radius of curvature of the switch cover plate is positioned on the side of the cover plate opposing the switch.

A thirty-seventh aspect of the present invention is the inclusion of a means to automate payment for the newspaper.

A thirty-eighth aspect of the present invention is whereby the means to automate payment for the newspaper utilizes payment made through a payment process using a two-way transmitting device such as a two way pager, two way radio, cellular technology, WiFi Technology, and the like.

A thirty-ninth aspect of the present invention is whereby the means to automate payment for the newspaper utilizes a keypad.

A fortieth aspect of the present invention is whereby the means to automate payment for the newspaper utilizes a pre-paid card or similar device.

A forty-first aspect of the present invention is whereby the means to automate payment for the newspaper utilizes a credit or debit card.

A forty-second aspect of the present invention is whereby the means to automate payment for the newspaper utilizes a credit or debit card in conjunction with the transmitter used for monitoring the inventory within the News Rack.

A forty-third aspect of the present invention is the ability to monitor when the first newspaper is sold.

A forty-forth aspect of the present invention is the ability to monitor when each newspaper is sold.

A forty-fifth aspect of the present invention is the ability to count the number of newspapers that are sold.

A forty-sixth aspect of the present invention is the ability to count the number of times the door of the News Rack is opened.

A forty-seventh aspect of the present invention is the ability to identify the time in which the first Newspaper is sold and report the respective information via transmitter.

A forty-eighth aspect of the present invention is the ability to identify the time in which the last Newspaper sold and report the respective information via transmitter.

A forty-ninth aspect of the present invention is the ability to transmit information collected within a processing device over time and transmit the respective information in conjunction with another transmission. An example would be the transmission of the time of the first sale and the number of papers sold when the system is transmitting the information respective to the last Newspaper sold.

A fiftieth aspect of the present invention is the ability to monitor the number of Newspapers within a News Rack.

A fifty-first aspect of the present invention is the utilizing of a pressure sensor to monitor the number of Newspapers within a News Rack.

A fifty-second aspect of the present invention is the utilization of a transmission that informs the News Rack of the approximate weight of the daily Newspaper.

A fifty-third aspect of the present invention is the ability to determine if more than one paper is removed respective to a single purchase.

A fifty-fourth aspect of the present invention is the ability to determine the number of papers by referencing the position of a moveable platform.

A fifty-fifth aspect of the present invention is the ability to calibrate the position of a moveable platform respective to the number of Newspapers by providing the daily weight of each paper (or a number of papers) into the system. The system would then be able to convert the provided position of the moveable platform to the number of Newspapers in a Newspaper Rack with a moveable platform.

A fifty-sixth aspect of the present invention is the ability to report the weight of the Newspapers and convert the weight of the Newspapers to the number of Newspapers by providing the daily weight of each paper (or a known quantity of papers) into the system. The system would then be able to convert the provided weight to the number of Newspapers in a Newspaper Rack with a moveable platform.

A fifty-seventh aspect of the present invention is the inclusion of an automated camera, wherein the camera would record an image of the customer that is suspected of removing more than one paper during the purchase of a single paper.

A fifty-eighth aspect of the present invention is the automated ability to transmit an image taken with the camera preferably using the inventory-monitoring transmitter.

A fifty-ninth aspect of the present invention is the ability to interchange tilt sensors using a pin and socket with different tilt sensors assemblies to change the angle of activation.

A sixtieth aspect of the present invention is the utilization of multiple switches in series and parallel to better identify the actual status when Newspapers are placed in multiple stacks/locations.

A sixty-first aspect of the present invention is the utilization of two or more switches in series to determine when multiple placements of Newspapers are depleted and in parallel to determine when the Newspapers are being replaced.

A sixty-second aspect of the present invention is the utilization of two or more switches in series to determine when multiple placements of Newspapers are depleted and in parallel to determine when the Newspapers are being replaced by recognizing a change in state then determining the time of the change. Should the time of the change be greater than a predetermined "first fill time", and the specific location has not yet registered a morning fill, the system interprets the change in state as a morning fill and acts accordingly.

A sixty-third aspect of the present invention is the placement of a door paper holder switch at the base of the paper holder.

A sixty-fourth aspect of the present invention is the placement of a door paper holder switch at the base of the paper holder wherein the door paper holder switch is actuated by proximity of or contact with the Newspaper.

A sixty-fifth aspect of the present invention is the placement of a door paper holder switch at the top or side of the paper holder.

A sixty-sixth aspect of the present invention is the placement of a door paper holder switch at the top or side of the paper holder, wherein the door paper holder switch is actuated by separating the paper holder and the News Rack access door, normally accomplished when the newspaper is inserted between the News Rack paper holder and the News Rack access door.

A sixty-seventh aspect of the present invention is the utilization of sensor in the door to determine activity within the News Rack, such as the purchase of a Newspaper.

A sixty-eighth aspect of the present invention is the utilization of sensor in the coin mechanism to determine activity within the News Rack, such as the purchase of a Newspaper.

A sixty-ninth aspect of the present invention is the utilization of a star network configuration for wireless communications between a plurality of deployed newspaper racks and a collector.

A seventieth aspect of the present invention is the inclusion of non-newspaper racks into the star configured newspaper rack network.

A seventy-first aspect of the present invention is the utilization of a mesh network configuration for wireless communications between a plurality of deployed newspaper racks and a collector.

A seventy-second aspect of the present invention is the inclusion of monitoring/communicating with non-newspaper rack devices into the mesh configured newspaper rack network.

A seventy-third aspect of the present invention interfaces an upload communications apparatus and said collector.

A seventy-fourth aspect of the present invention utilizes an upload communications apparatus, said upload communications apparatus can be of cellular, paging, trunking radio, Wi-Fi, Ethernet, Internet, dial-up modem, or any other such long distance communications device(s).

A seventy-fifth aspect of the present invention utilizes unlicensed frequency space for at least one of the star and mesh network configurations. One such example is 900 MHz. Another such example utilizes frequency hopping processing.

A seventy-sixth aspect of the present invention provides such non-newspaper rack devises such as vending machines, postal/parcel drop boxes, ATM's, utility meters, gas tank meters, traffic monitoring devices, weather monitoring devices, alarm monitoring devices, anti-theft devices, and the like.

A seventy-seventh aspect of the present invention provides a self-healing network, wherein should one transceiver become incapacitated, the remaining transceivers adjust to communicate with the balance of functioning transceivers.

A seventy-eighth aspect of the present invention utilizes a tilt sensor or accelerometer in any normally-stationary apparatus, wherein said tilt sensor or accelerometer detects any non-desirable motion. Said non-desirable motion is considered vandalism or theft. Such normally-stationary apparatus include, but not limited to, fine art, vending machines, medical equipment, lab equipment, appliances, computers, racked electronics, construction equipment, generators, compressors, inventory pallets, refrigerators, parcel drop boxes, air conditioners, cash registers, safes, kiosks, kiosk after hour security enclosures, slot machines, toolboxes, porto-potty's, trailers, construction materials, and the like.

A seventy-ninth aspect of the present invention utilizes a tilt sensor or accelerometer in any normally-stationary apparatus in conjunction with an operational recognition means, wherein said operational recognition means identifies when the object being monitored should be stationary and when the object being monitored can potentially be moving. One such means is a switch. A second such means is a timer. A third such means is a remote controlling device. Other such devices by those skilled in the art can also be incorporated.

An eightieth aspect of the present invention utilizes a GPS system, wherein said GPS system is programmed to recognize the desired location of an object. Should the monitored object stray from the desired location, the software would direct a communication that the object has been transferred outside an acceptable location/boundary.

An eighty-first aspect of the present invention utilizes a tilt sensor or accelerometer to initialize said GPS location system, thus reducing battery consumption.

An eighty-second aspect of the present invention provides an audio output when an object is monitored with a tilt sensor or accelerometer and such senses an unwarranted motion.

An eighty-third aspect of the present invention provides a audio output when a object is monitored with a tilt sensor or accelerometer and such senses an unwarranted motion, wherein said object is at least one of: a Newspaper Rack, fine art, medical equipment, lab equipment, vending machines, appliances, computers, racked electronics, construction equipment, generators, compressors, inventory pallets, refrigerators, parcel drop boxes, air conditioners, cash registers, safes, kiosks, kiosk after hour security enclosures, slot machines, toolboxes, porto-potty's, trailers, construction materials, and the like.

An eighty-fourth aspect of the present invention additionally monitors openings such as doors to each object.

An eighty-fifth aspect of the present invention provides a verification process within the communications, wherein said verification process comprising a two-way communication. A first transceiver would communicate to a second transceiver. Said second transceiver would respond to said first transceiver to acknowledge the message. Said first transceiver would wait a predetermined timeframe to receive the acknowledgement. Should said predetermined timeframe expire prior to receipt of said acknowledgement, said first transceiver would retransmit the message. Alternatively, said first transmitter can transmit a message to any other local transceiver to circumvent a potentially disabled transceiver within said network.

An eighty-sixth aspect of the present invention provides a tilt sensor with a pair of leads, one pair at a first angle and a second pair at a second angle, providing the user with the ability to mount the enclosure at multiple angles.

An eighty-seventh aspect of the present invention provides a tilt sensor with a pair of leads bent at a 45 degree angle and a respective connector with an interface at a 45 degree angle. Said 45 degree angle provides the user the ability to insert the leads in a first orientation for a first monitoring angle and a second orientation for a second monitoring angle.

BRIEF DESCRIPTION OF THE DRAWINGS

For the purpose of initially illustrating the invention, there is shown in the flow diagram, an embodiment that is presently preferred. It should be understood, however, that the present invention is not limited to the specific instrumentalities and methods disclosed. It can be recognized that the flow diagram represents a method and the associated apparatuses required to make the method in which persons skilled in the art may make various flow and interface diagrams from therein. In the drawings.

It should be understood that the order or process steps might deviate from each of the illustrations/flow diagrams provided herein, while maintaining the spirit and intent of the present invention.

DETAILED DESCRIPTION OF THE DRAWINGS

Figure 1:
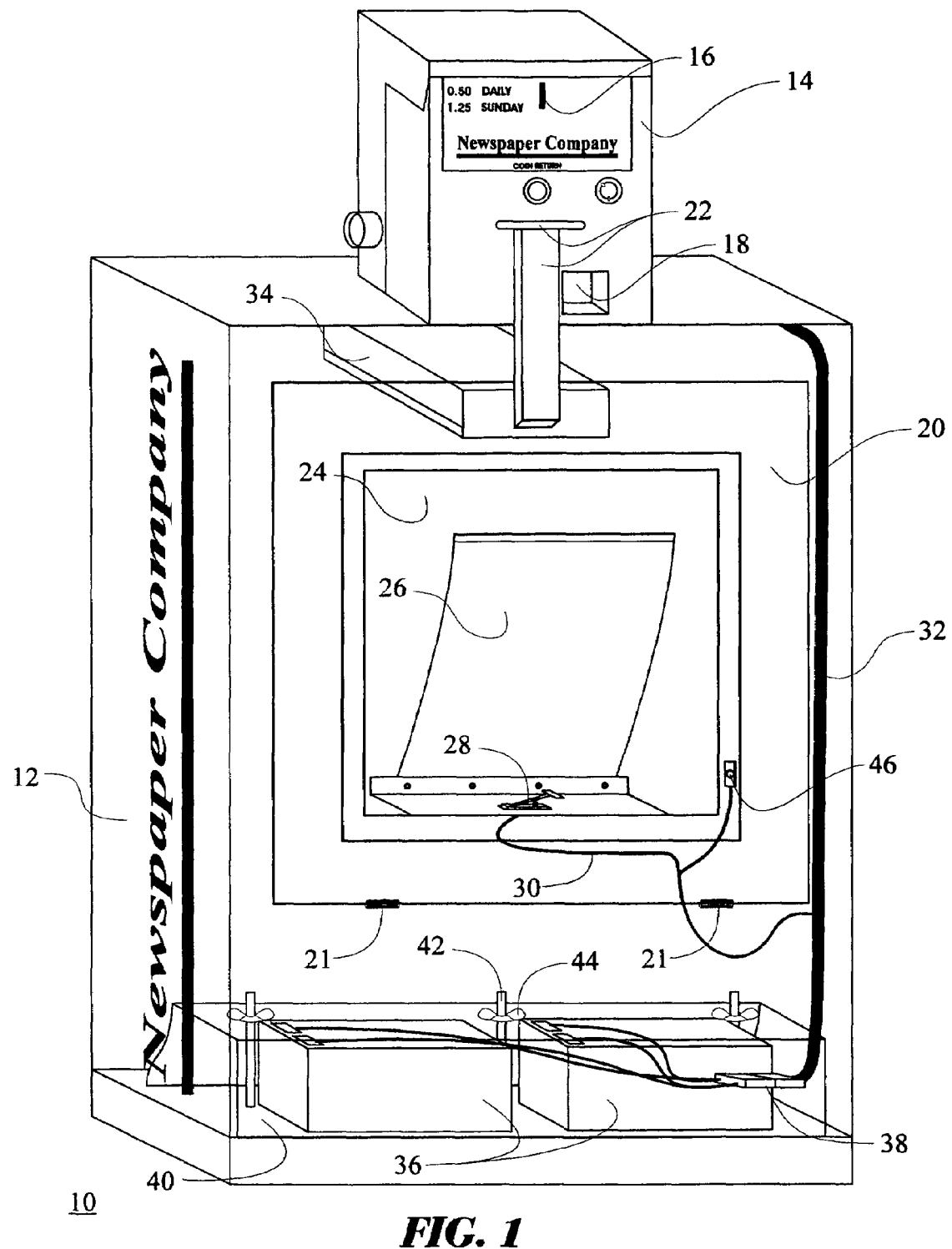
FIG. 1 is an isometric illustration of the preferred embodiment of a monitored News Rack as reduced to practice.

FIG. 1 illustrates a detailed isometric view of a Monitored News Rack 10 to more clearly define the preferred embodiment of the present invention. The Monitored News Rack 10 includes a News Rack body 12 comprising a News Rack front and back 58, News Rack sides 60, and a News Rack top 62. The Monitored News Rack 10 contains mechanisms required to dispense newspapers, including a News Rack access door 20 that is moveably coupled to the housing via News Rack access door hinges 21. The News Rack access door 20 can include a News Rack access door handle 22, a News Rack access door transparent viewing panel 24 and a News Rack paper holder 26 to display the current newspaper (not shown in this illustration). The Monitored News Rack 10 comprises other standard features for a Newspaper Rack, such as a News Rack coin head 14 which contains a 16 and a coin return slot 18. The Monitored News Rack 10 includes an inventory management system comprising a News Rack door paper holder sensor 28, a News Rack monitoring system wiring harness 30, a News Rack monitoring system interface board and transmitter 34, and a power source 36. The News Rack monitoring system wiring harness 30 may be placed within a News Rack monitoring system wiring harness protection 32. An optional door status sensor 46 can be included, wherein the door status sensor 46 can be utilized for several features, include but not limited to: counting the number of times the News Rack access door 20 is opened, turning on the monitoring system, determining that a single newspaper is being purchased, and the like.

In the preferred embodiment, the power source 36 comprising at least one lead acid battery electro-mechanically coupled to the inventory management system by a power source connector(s) 38. The power source(s) 36 are secured within the Monitored News Rack 10 by a power source cover 40. In the preferred embodiment, the power source cover 40 is an inverted plastic rain gutter. The power source cover 40 can be secured using a plurality of power source cover securing studs 42, positioning the power source cover securing studs 42 through holes within the power source cover 40 and securing with power source cover securing fastener(s) 44. The plurality of power source cover securing studs 42 can be assembled into a battery hold down base bracket 122. The battery hold down base bracket 122 can then be secured to the News Rack bottom 120 using adhesive such as Liquid Nails™.

The News Rack door paper holder sensor 28 interfaces with the News Rack monitoring system interface board and transmitter 34, whereby the News Rack door paper holder sensor 28 can provide an indication independently or in conjunction with a logic circuit (not shown) to the News Rack monitoring system interface board and transmitter 34 when the inventory reaches a predetermined quantity. Normally, the last Newspaper removed is the Newspaper placed within the News Rack paper holder 26. In the preferred embodiment, the News Rack door paper holder sensor 28 indicates when the last Newspaper is removed. The inventory monitoring system (internal software, external software, circuitry, etc.) resets the system after a predetermined time (the preferred embodiment resets at 11:30 PM). The system would recognize when the Newspaper exchanged with a current Newspaper. The communication process will be described in detail within the specification.

Figure 2:
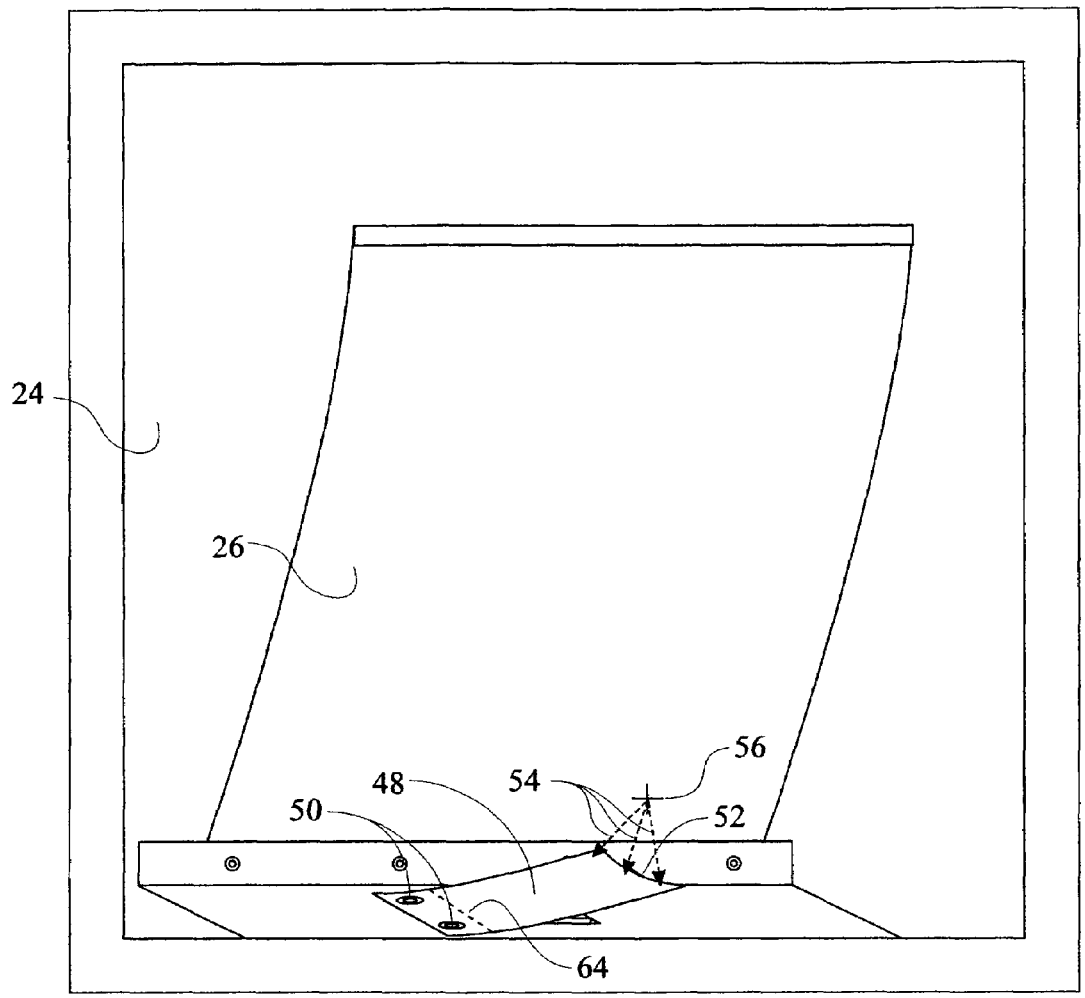
FIG. 2 is an isometric illustration of a sensor and sensor cover consistent with the preferred embodiment of the present invention.

FIG. 2 is an isometric illustration of a News Rack door paper holder sensor 28 (not shown) and News Rack door paper holder sensor cover 48 consistent with the preferred embodiment of the present invention. The News Rack door paper holder sensor cover 48 is coupled to the News Rack paper holder 26 by two (or more) News Rack door paper holder sensor cover coupling member(s) 50. The News Rack door paper holder sensor cover 48 can be fabricated of a flexible material and in a shape such to include a sensor cover curvature 52. The sensor cover curvature 52 is of some sensor cover radius 54 with a sensor cover curvature radius focal point 56. The News Rack door paper holder sensor cover 48 is then secured to the News Rack door paper holder sensor 28, oriented wherein the sensor cover curvature radius focal point 56 away from the News Rack door paper holder sensor 28 as illustrated. A sensor cover fold 64 may be fabricated into the News Rack door paper holder sensor cover 48 allowing the upward force of the News Rack door paper holder sensor 28 to raise the News Rack door paper holder sensor cover 48. The News Rack door paper holder sensor cover 48 helps conceal the News Rack door paper holder sensor 28 (as shown) as well as compensating for a broader coverage of the Newspaper width and placement. The broader coverage eliminates false information, ensuring the deposited Newspaper engages the News Rack door paper holder sensor 28.

Figure 3:
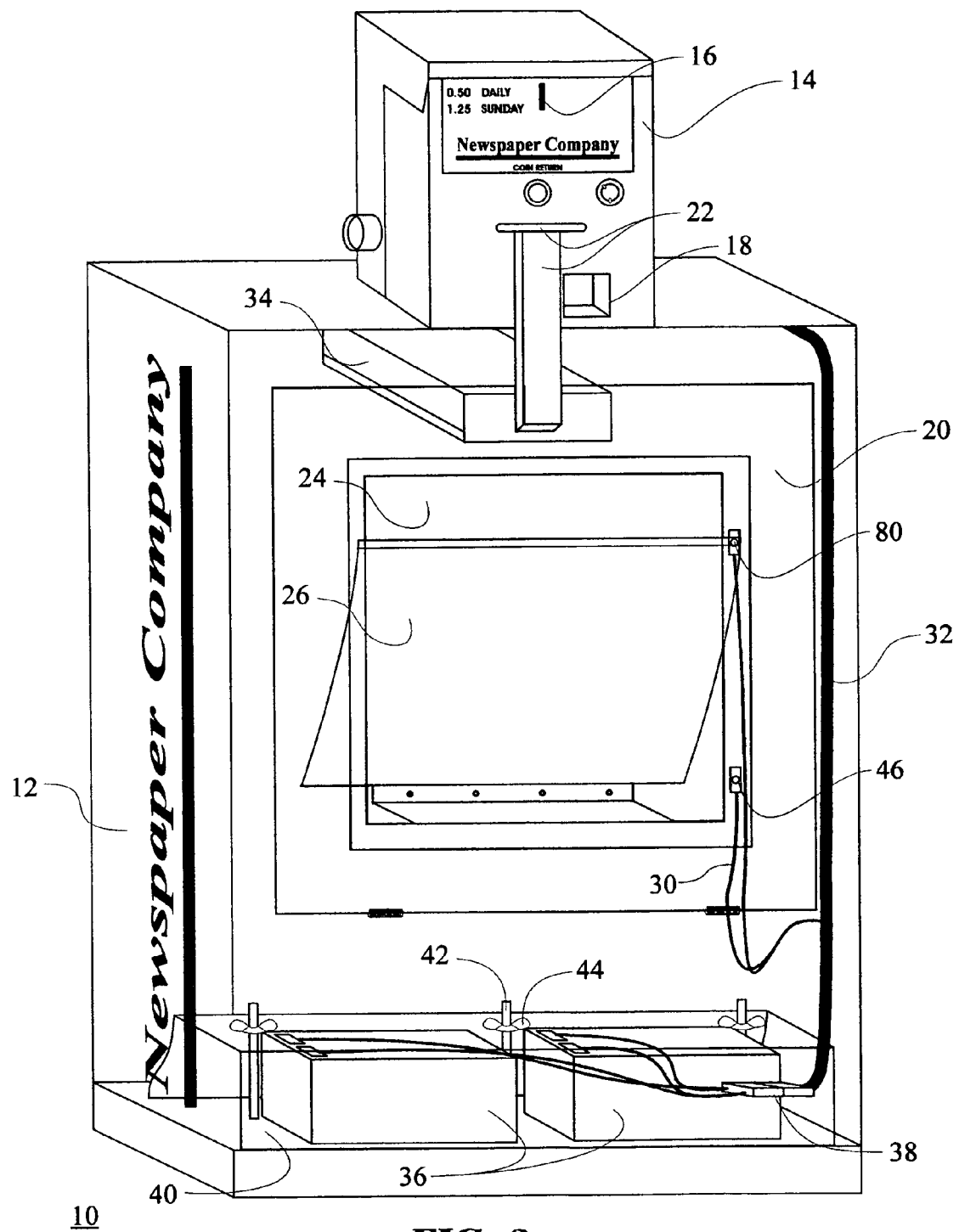
FIG. 3 is an isometric illustration of an alternate inventory sensor location within a monitored News Rack.

FIG. 3 is similar to the Monitored News Rack 10 of FIG. 1, illustrating an alternate embodiment for the inventory management sensor. The alternate embodiment positions a News Rack paper holder sensor 80 in a manner whereby when a Newspaper is inserted into the News Rack door paper holder sensor 28, the top portion of the News Rack door paper holder sensor 28 separates from the News Rack access door 20 and News Rack access door transparent viewing panel 24 causing the News Rack paper holder sensor 80 to change state. The News Rack paper holder sensor 80 can be mechanically coupled to either the News Rack access door 20 or the News Rack paper holder 26, interfacing with the opposing News Rack paper holder 26 or News Rack access door 20 respectively.

Figure 4:
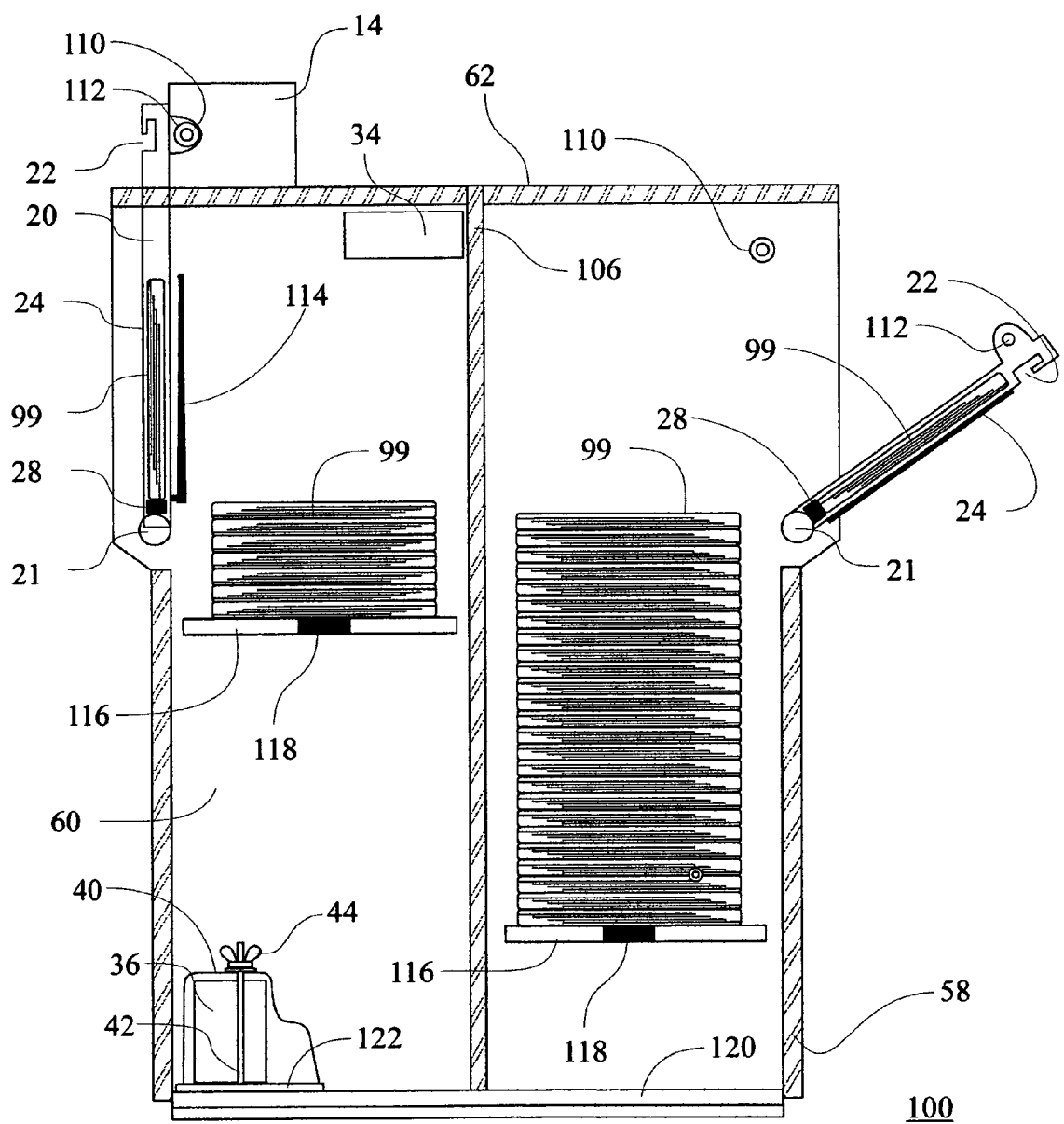
FIG. 4 is a cross sectional view of a modular (multiple distribution) News Rack illustrating another alternate inventory sensor location within a monitored News Rack.

FIG. 4 is of a Modular (multi-location) Newspaper Rack 100, wherein the Modular (multi-location) Newspaper Rack 100 is similar to that of Monitored News Rack 10 with multiple sales/distribution sections for holding stacks of Newspaper(s) 99. The figure illustrates several features not described in FIG. 1. The Modular (multi-location) Newspaper Rack 100 illustrated presents a News Rack sectional divider 106 to segregate the multiple sales/distribution sections. Further illustrated is a door release mechanism 110 and a door release latch 112, collectively utilized to limit access to the multiple sales/distribution sections to when proper payment is completed. An alternate embodiment of the present invention is shown, placing a platform sensor 118 to a rigid or moveable newspaper platform 116. The rigid or moveable newspaper platform 116 can be either fixed or designed to be moveable, whereby the rigid or moveable newspaper platform 116 adjusts based upon the weight of the Newspaper(s) 99 to keep the Newspaper(s) 99 proximate the News Rack access door 20. The illustration is representative of the described scenario. The illustration includes a transceiver antenna 114 which can optionally be included to enhance transmission signal strength. It would be desirable to locate the transceiver antenna 114 proximate the News Rack access door transparent viewing panel 24.

Figure 5:
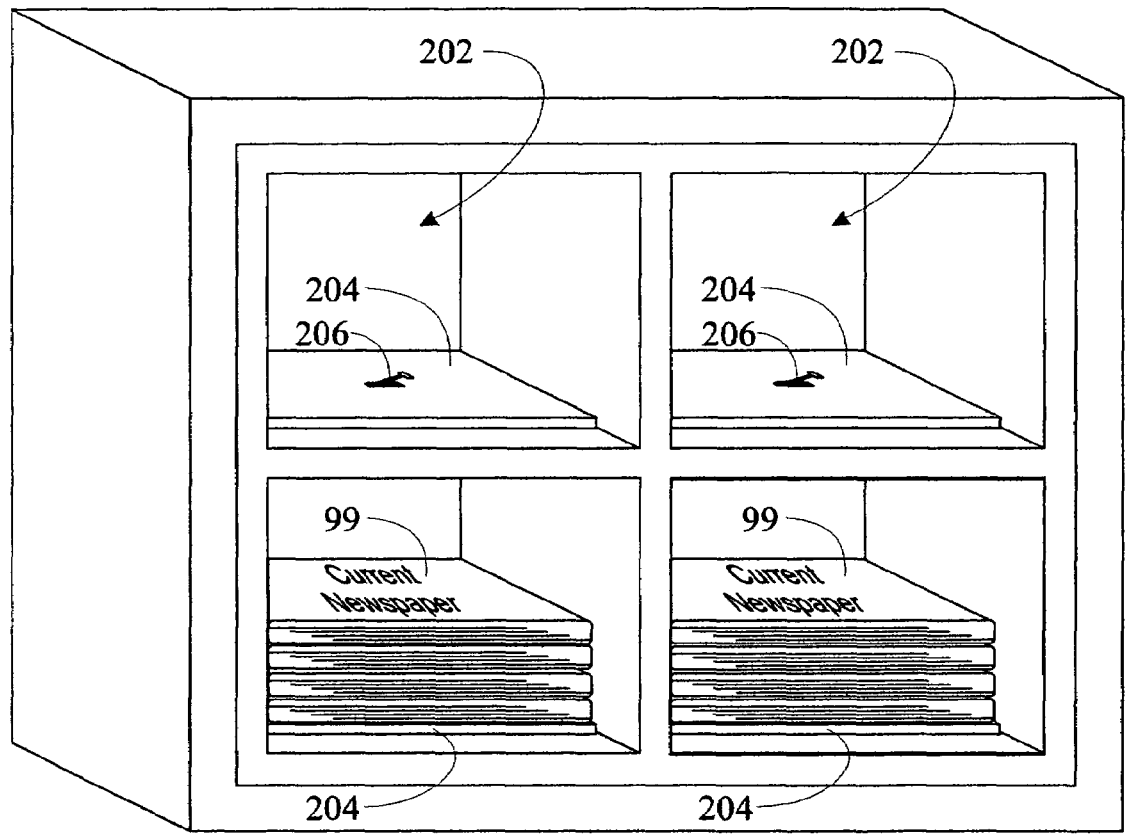
FIG. 5 is an isometric illustration of a monitored storefront News Rack.
Figure 6:
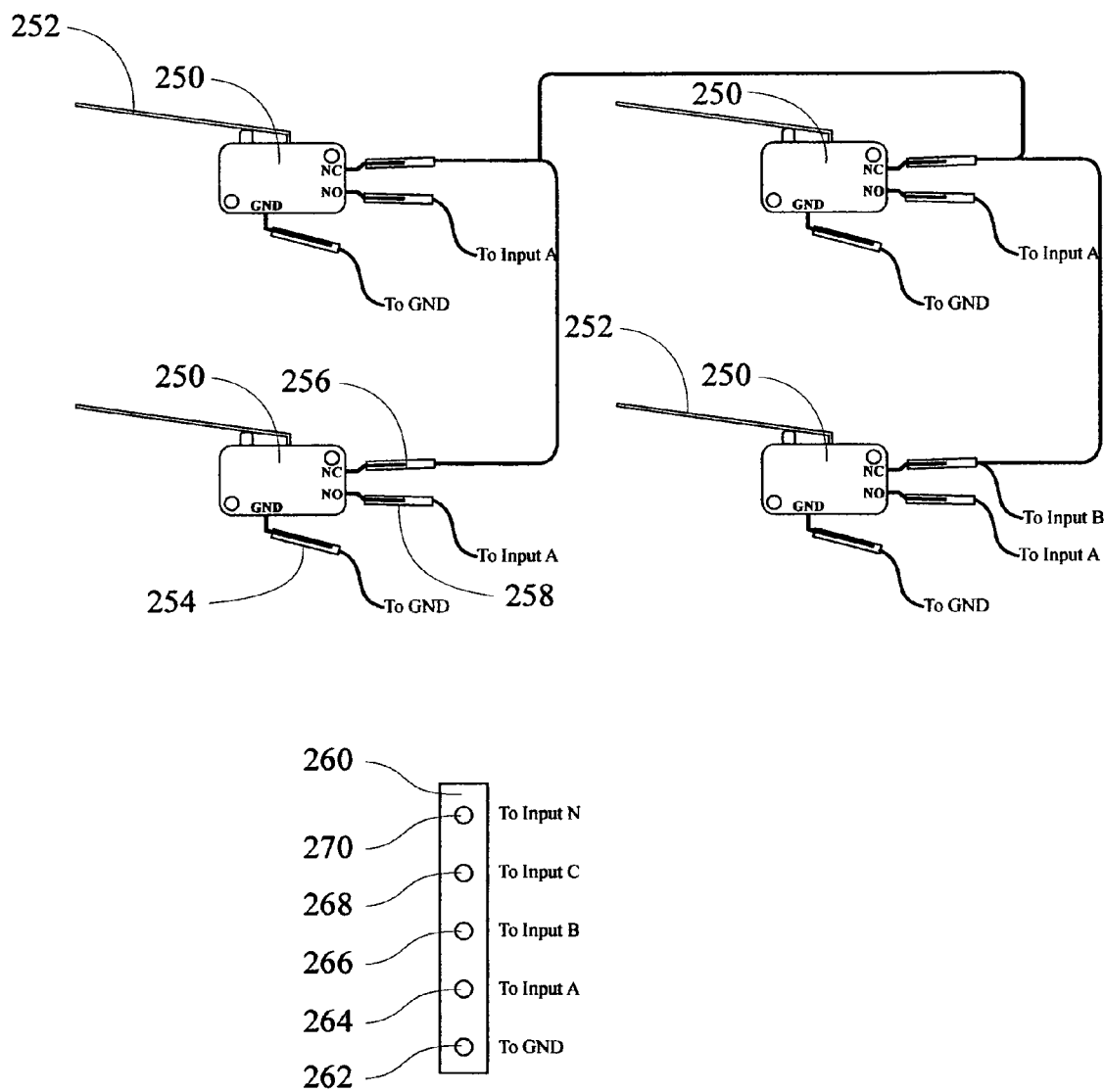
FIG. 6 is a conceptual schematic of a multi-switch configuration for monitoring multiple stacks of Newspapers.

FIG. 5 is of a Storefront News Rack 200. The Storefront News Rack 200 comprising at least, and generally a plurality of Storefront News Rack inventory slot(s) 202. The Storefront News Rack 200 utilizes the same general features of Monitored News Rack 10, including a Storefront paper sensor(s) 206 (similar to a News Rack door paper holder sensor 28), News Rack monitoring system wiring harness 30 (not shown), News Rack monitoring system interface board and transmitter 34 (not shown), and a power source 36 (not shown). The power source 36 can be an AC source as opposed to a battery as directed to the Monitored News Rack 10. Each Storefront paper sensor(s) 206 can be assembled into a Storefront paper tray(s) 204 for ease of installation. A cover similar to News Rack door paper holder sensor cover 48 can be utilized if desired. FIG. 6 will describe one embodiment utilizing a plurality of sensors within a plurality of Newspaper holders to ensure the correct information is provided. The Storefront News Rack 200 illustrated is of a Formica cabinet design. Alternate designs such as a wire rack, storefront sled, and the like may be utilized. The wiring harness can be designed to be size adjustable allowing the increase or decrease in the number of sensors deployed as required.

FIG. 6 illustrates a plurality of dual output sensor(s) 250 within a plurality of Newspaper holders to ensure the correct information is provided. Each dual output sensor(s) 250 comprising a dual output sensor input 252, a sensor ground or common terminal 254, a sensor normally closed terminal 256, and a sensor normally open terminal 258. The News Rack monitoring system interface board and transmitter 34 (not shown) includes a transceiver input terminal connector 260. The transceiver input terminal connector 260 is designed to include the desired number of inputs, a transceiver input ground/common terminal connector 262, transceiver input A terminal connector 264, transceiver input B terminal connector 266, transceiver input C terminal connector 268 and a transceiver input N terminal connector 270, wherein transceiver input N terminal connector 270 represents any additional number of input positions. Each of the dual output sensor inputs 252 are electrically coupled to a single node; the transceiver input ground/common terminal connector 262. Each of the sensor normally open terminal(s) 258 is electrically coupled to a single node; the transceiver input a terminal connector 264, providing a parallel circuit between each switch. In this manner, when any one dual output sensor(s) 250 is activated, the circuit becomes closed. Each of the sensor normally closed terminal(s) 256 are electrically coupled to another sensor normally closed terminal(s) 256 with the one end sensor normally dosed terminal(s) 256 connected to the input; the transceiver input B terminal connector 266, providing a serial circuit between each switch. In this manner, all of the dual output sensor(s) 250 must be activated then the circuit becomes closed. This circuitry allows any multiple location network such as the Storefront News Rack 200 the ability to indicate when all inventory positions such as Storefront News Rack inventory slot(s) 202 are empty as well as when a single inventory positions such as Storefront News Rack inventory slot(s) 202 is exchanged (such as a new days paper) or replenished.

Figure 7:
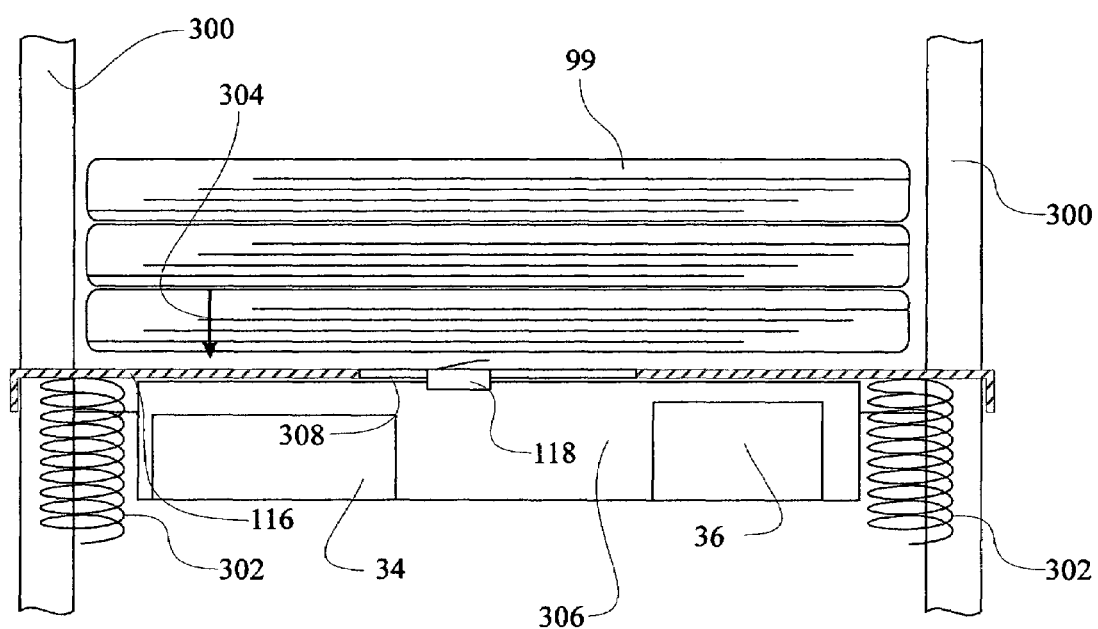
FIG. 7 is a cross sectional view of a portable News Rack inventory monitoring system.

FIG. 7 illustrates a Portable Monitoring System 306 installed into a rack with a moveable version of the rigid or moveable newspaper platform 116. The figure provides additional details of the mechanics behind the moveable version of the rigid or moveable newspaper platform 116. The Portable Monitoring System 306 comprising the same components of the general monitoring system as described above. The components include: News Rack monitoring system interface board and transmitter 34, power source 36, and platform sensor 118. Each are interconnected with a News Rack monitoring system wiring harness 30 (not shown in this illustration). The Portable Monitoring System 306 is temporarily coupled to the rigid or moveable newspaper platform 116, positioning the platform sensor 118 through a newspaper platform aperture 308. This provides the ability to easily install and remove the Portable Monitoring System 306 into a unit currently deployed in the field for temporary monitoring of the News Rack. When the Newspaper(s) 99 are placed onto the platform sensor 118, the Newspaper(s) 99 applies an inventory indicating force 304 that causes the platform sensor 118 to change state. The News Rack monitoring system interface board and transmitter 34 registers the change in state of platform sensor 118 and acts accordingly. The moveable version of the rigid or moveable newspaper platform 116 is controlled by a moveable platform vertical control columns 300 and moveable platform inventory positioning spring(s) 302.

Figure 8:
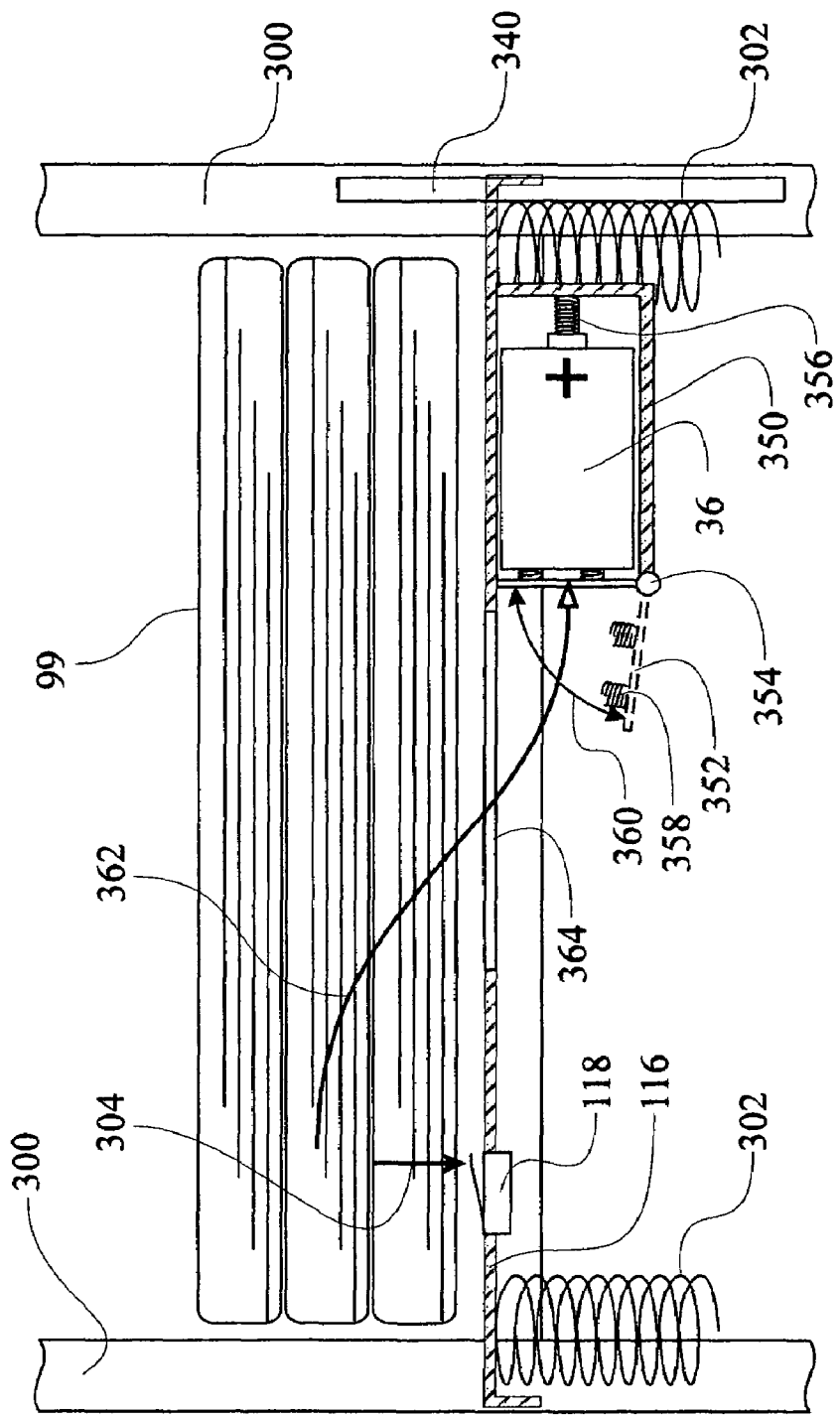
FIG. 8 is a cross sectional view of a moveable platform illustrating an alternate inventory sensor and an alternate battery installation.

FIG. 8 illustrates an alternate inventory sensor and an alternate installation for the power source 36.

The service person would deposit a number of Newspaper(s) 99 onto the rigid or moveable newspaper platform 116 as well as one Newspaper 99 into the News Rack paper holder 26 of the News Rack access door 20. The rigid or moveable newspaper platform 116 is suspended along moveable platform vertical control columns 300 by moveable platform inventory positioning spring(s) 302. The rigid or moveable newspaper platform 116 would lower as a result of the weight of the Newspaper(s) 99 against the force of the moveable platform inventory positioning spring(s) 302. The deposited Newspaper(s) 99 will change the state of a moveable platform inventory sensor 340 and/or a News Rack door paper holder sensor 28. A sensor can be positioned relationally to the rigid or moveable newspaper platform 116 to identify when the rigid or moveable newspaper platform 116 passes a predetermined position, reflecting an estimated number of remaining Newspaper(s) 99. Alternately, the inventory indicating force 304 can register the displacement/position of the rigid or moveable newspaper platform 116. By knowing certain characteristics of the moveable platform inventory positioning spring(s) 302 (spring rate/calibration), and the weight of each Newspaper 99, the system can calculate the number of Newspaper(s) 99 deposited/remaining. A second embodiment would be using a scale that is positioned within the News Rack to provide a weight of the Newspaper(s) 99 to the inventory monitoring system. The weight can be used to determine a variety of information such as the number of Newspaper(s) 99 originally deposited, the number of Newspaper(s) 99 at any point in time, and the number of Newspaper(s) 99 when the Newspaper(s) 99 are exchanged. This information can automate the tracking of the number of Newspaper(s) 99 originally deposited, the number of Newspaper(s) 99 at any point in time, and the number of Newspaper(s) 99 that are not sold or returned. It can be recognized that the moveable platform inventory sensor 340 can be mechanically coupled to the moveable platform vertical control columns 300, the rigid or moveable newspaper platform 116, the News Rack front and back 58, the News Rack sides 60, utilizing the moveable platform inventory positioning spring(s) 302, or any other means of measuring weight or displacement.

The rigid or moveable newspaper platform 116 includes a battery access cutout 364 for accessing the power source 36 located within a battery housing 350. The battery housing 350 comprises a housing, a battery-housing door 352 coupled to the battery housing via a battery door hinge 354, and a battery contacts 356 for each terminal of the power source 36. The battery-housing door 352 would preferably comprise a compliant member 358 such as springs to maintain a pressure contact between the battery terminals and the battery contacts 356. The power source 36 would be installed and removed through the battery access cutout 364 within the rigid or moveable newspaper platform 116 such as by following a battery-changing path 362. A service person would open/close battery door process 360 the battery-housing door 352, remove the drawn power source 36, install a fresh power source 36, and open/close battery door process 360 the battery-housing door 352. When closed, the battery-housing door 352 would apply pressure to maintain an electrical connection between the power source 36 and the battery contacts 356.

Figure 9:
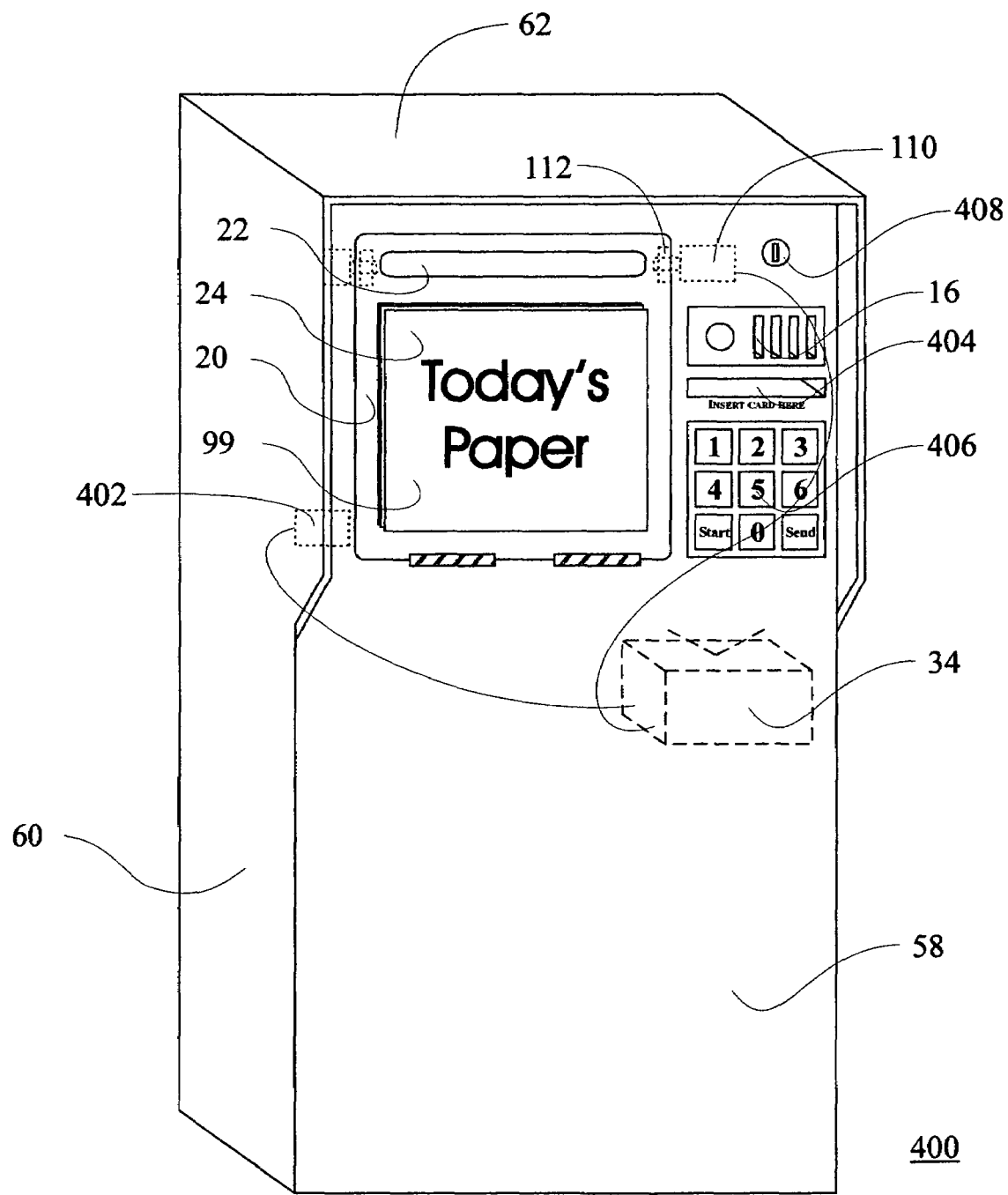
FIG. 9 is an isometric view of an enhanced payment News Rack, standard coin and alternative payment mechanisms.

FIG. 9 illustrates an alternate payment News Rack 400 comprising the utilization of alternate payment mechanisms, taking advantage of the installed News Rack monitoring system interface board and transmitter 34. The preferred embodiment would comprise an electromechanical release mechanism. The door release mechanism 110 can be activated by a voltage or current applied from the News Rack monitoring system interface board and transmitter 34, whereby the News Rack monitoring system interface board and transmitter 34 originally is provided input signals from any of a number of payment interface methods. Examples of the payment interface methods include but are not limited to a mechanical or electromechanical coin receiving mechanism (represented as the coin slot 16), a card payment reader 404, and a keyboard 406. The interface may also be accomplished by wireless interfacing between an external wireless device such as bluetooth technology, cell phone transmissions, two-way pager transmissions, Wi-Fi Transmissions, and the like and the News Rack monitoring system interface board and transmitter 34 of the News Rack.

One option would be wherein the consumer is provided a prepayment code. This could result from a number of reasons: a bulk purchase pre-payment, a credit for an unreceived purchase, a promotion, a group purchase, and the like. The Newspaper support sales person would enter the information into a sales management system. The sales management system can either transmit the information to a specific News Rack or continue to be maintained in the sales management system network, or both. The consumer would then go the either any rack or a specific rack and enter the prepayment code. The preferred embodiment would allow the consumer to go to any rack, enter the prepayment code; the prepayment code would be transmitted to the sales management system network; the sales management system network would validate the prepayment code; and allow the consumer to remove a Newspaper. Alternately, the sales management system network would transfer the prepayment code to a specific News Rack and when the consumer enters the prepayment code, the system within the News Rack would validate the prepayment code and allow the consumer to remove a Newspaper.

News Racks generally include a price changing mechanism 408 that is a mechanical apparatus, generally affected by a key. The present invention includes an electronic or electromechanical price changing mechanism 408 which can be remotely controlled via a message to the News Rack monitoring system interface board and transmitter 34. The network can transmit a single message to each of the racks or a "bulk message" to a plurality or all of the News Racks requesting the News Rack(s) to change the price of the Newspapers. This reduces the time required that each service person stay at each rack during times in which the price changes. This also ensures all of the News Racks are properly priced. An acknowledgement transmission between the News Rack monitoring system interface board and transmitter 34 and the system network to ensure receipt of the transmission. Alternatively, the News Rack monitoring system interface board and transmitter 34 can include an indicator to inform the Service Person that the price has been changed.

Figure 10:
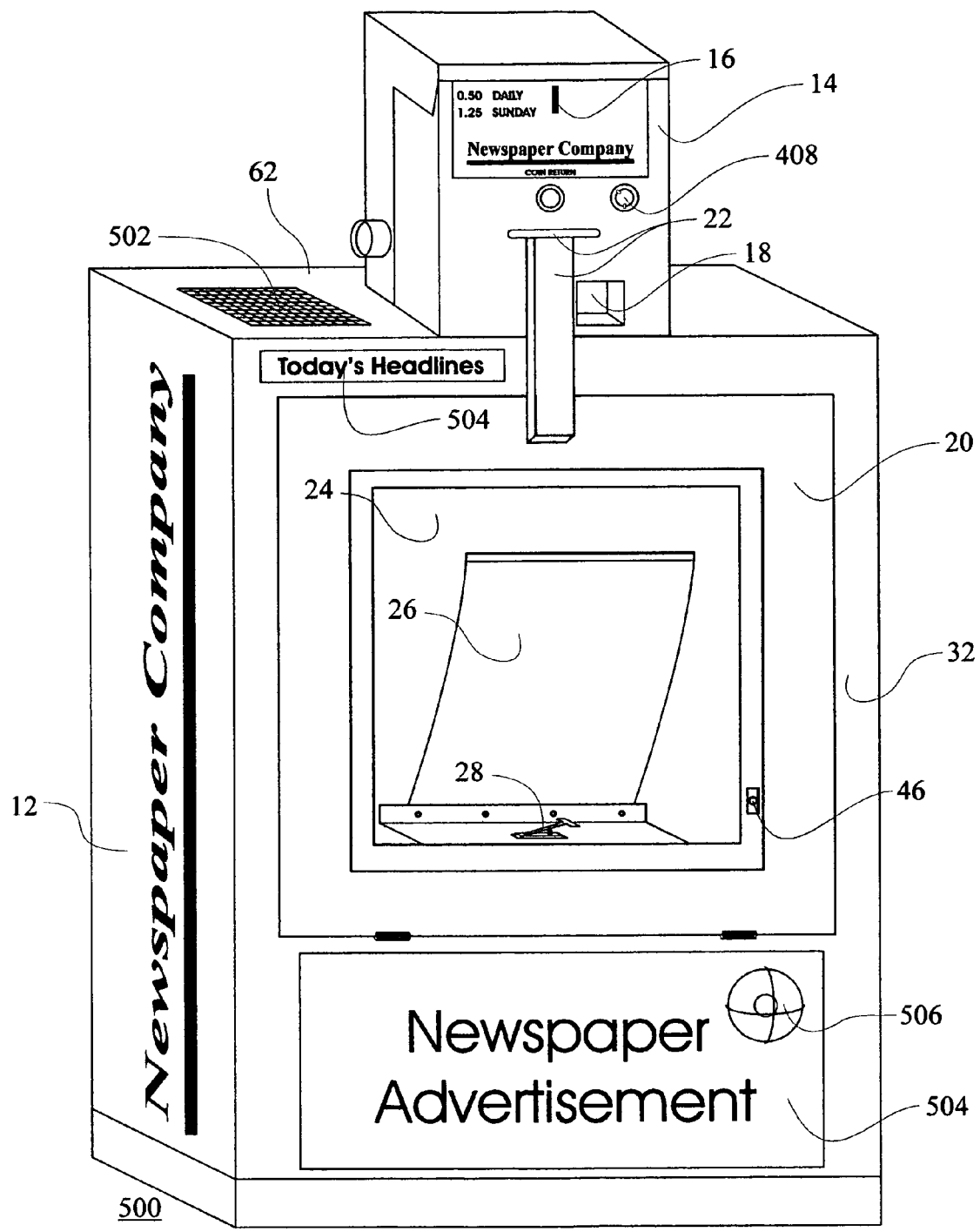
FIG. 10 is an isometric view of an enhanced marketing News Rack, comprising visual and audio marketing apparatus.

FIG. 10 illustrates an isometric frontal view of an enhanced marketing News Rack 500 further demonstrating several other innovative features of the present invention.

The illustration includes a Solar Panel 502, a visual emitting device 504 for visually attracting customers, and an audio emitting device 506 for audibly attracting customers. The Solar Panel 502 would be used for power. The power would be to supplement power to the enhanced marketing News Rack 500, for recharging a power source 36 (not shown in this figure), or both. An alternate charging source may be a generator type device coupled to the News Rack access door 20, whereby when each time the News Rack access door 20 is opened, the motion causes the generator to turn and output a current. The visual emitting device 504 could be an LED module, LCD module or other means to provide changeable displays. The audio emitting device 506 could be a speaker or any similar device to transmit audible signals to attract the attention of customers. Each of these devices visual emitting device 504 and the audio emitting device 506 can be activated by a proximity sensor, whereby when a potential customer passes the enhanced marketing News Rack 500, the proximity sensor would trigger a circuit and the customer attraction device would become active. The customer attraction device may become inactive after a predetermined period of time. The present invention includes a receiver that would allow the Newspaper Company to change the messages presented using the visual emitting device 504 and/or the audio emitting device 506. The transmitted messages would be changeably stored within an electronic module.

Newspaper Racks are located across a large, varied area. This distribution of Newspaper Racks provides a vast ability to collect data. Within the present invention, it can be recognized that sensors to obtain data on external interest can be positioned proximate the enhanced marketing News Rack 500. External sensors can include proximity sensors to monitor passing traffic, humidity sensors, temperature sensors, rain gauges, noise sensors, and any other items that can be desirable to be monitored. The data collected can be remotely transmitted using the same systems used for monitoring inventory levels. This provides a distributed network of platforms for collecting data as well as a means for offsetting the monitoring costs that would normally be incurred by the Newspaper Company.

Figure 11:
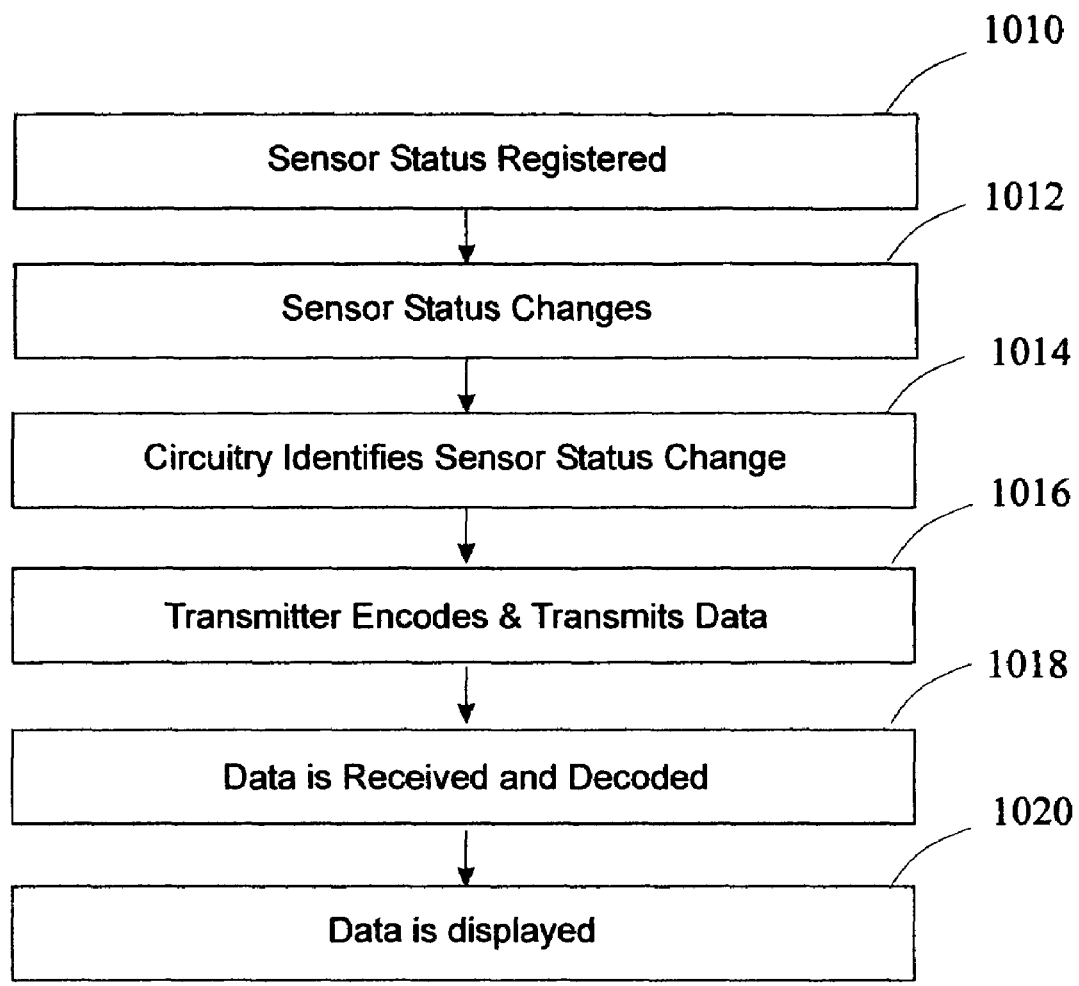
FIG. 11 is a flow chart diagram illustrating the steps of remotely monitoring the inventory of a New Rack.

FIG. 11 is a flow chart diagram that illustrates a generic flow chart of an automated notification system. The sensor (such as News Rack door paper holder sensor 28) would register its initial state as a first step 1010. The sensor (such as News Rack door paper holder sensor 28), at some point in time, would change state, registering a change in what is being monitored such as change in inventory of the Newspaper(s) 99 as a second step 1012. A circuit used to monitor the sensor would identify the change in state of the sensor as a third step 1014. The circuit would interpret the change in state of the sensor and encode the respective information for transmission. The News Rack monitoring system interface board and transmitter 34 would then transmit the encoded information as a fourth step 1016. The transmitted information would be received by the desired receiving station, such as a base station receiving gateway, email message, text message, and the like. The receiving station would then decode the transmitted message as a fifth step 1018. The decoded information can then be placed into a data base and acted upon accordingly in a manner to present the information to the recipient as a sixth step 1020.

Figure 12:
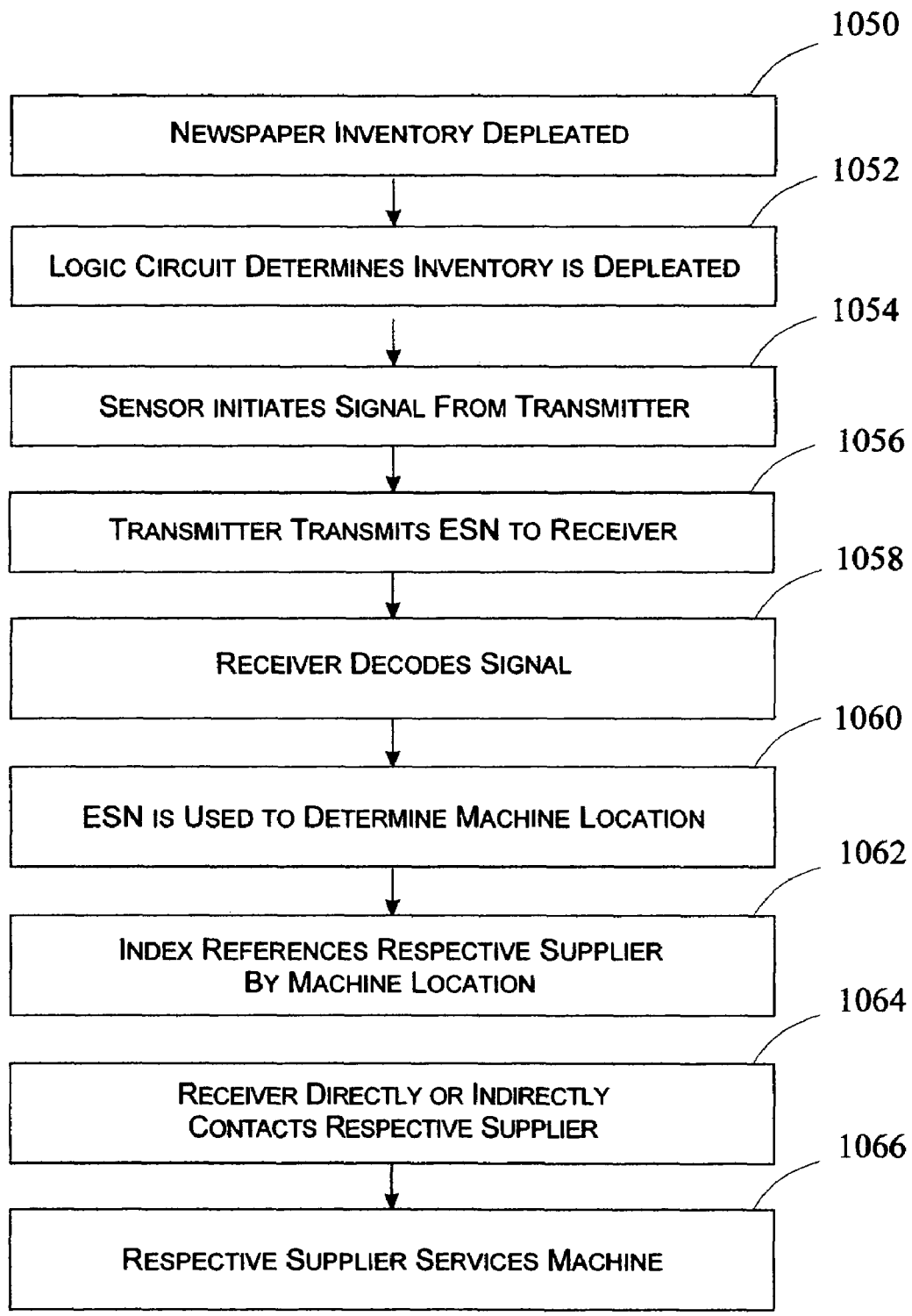
FIG. 12 is a flow diagram further detailing the steps of remotely monitoring the inventory of a New Rack consistent with the preferred embodiment of the present invention.

FIG. 12 is a flow chart diagram that illustrates one method in which a transmitter can notify a party that a particular Monitored News Rack 10 requires servicing. As the Newspaper(s) 99 are sold, the inventory is reduced to a predetermined quantity or completely depleted, as in first step Monitored News Rack 1050. The reduction of inventory would meet or surpass a predetermined quantity whereby once the inventory surpasses the predetermined quantity, a sensor such as the News Rack door paper holder sensor 28 (and combined logic circuit) would communicate with the News Rack monitoring system interface board and transmitter 34, a logic circuit would determine that there was a change in state as a second step Monitored News Rack 1052. The logic circuit would the direct the News Rack monitoring system interface board and transmitter 34 to initiate a signal as a third step Monitored News Rack 1054. The sensors can be placed within the News Rack access door 20, coupled to the rigid or moveable newspaper platform 116 of the Monitored News Rack 10, which can be coupled to the News Rack body 12, moveably coupled to the moveable platform vertical control columns 300, and the like. The applied sensor(s) would be preferably normally in one state such as normally open when the inventory is filled, and change to an opposing state or closed, when the inventory reaches the predetermined quantity such as depleted. These will be further illustrated in later figures. A logic circuit would regularly or continuously scan the various sensors to determine when a sensor has changed status. One such example is a logic circuit that would scan approximately every 5 seconds. When the logic circuit determines that a sensor have changed state, the News Rack monitoring system interface board and transmitter 34 would then transmit a signal to a receiver as a fourth step Monitored News Rack 1056. The signal can include an identifier such as an electronic serial number, a telephone number, and the like to provide a means for the receiver to identify the News Rack monitoring system interface board and transmitter 34. The receiver would receive the signal with the encoded information and decode it as a fifth step Monitored News Rack 1058. The receiving and decoding device would use the decoded information to determine the location of the Monitored News Rack 10 that requires servicing. The receiving and decoding device can further include a means to determine the time and a means to record any desired information such as specific Monitored News Rack 10 and time in which the signal is received. The specific Monitored News Rack 10 and deployed location can be determined by comparing the electronic serial number (ESN) or other encoded information to a known database which cross-references the encoded information with a known location as a sixth step Monitored News Rack 1060. The receiver and decoding device would, in turn, use the location information to determine which respective supplier should be notified to service the Monitored News Rack 10 and how to contact the respective supplier as a seventh step Monitored News Rack 1062. The receiver and decoding device can then communicate with the respective supplier or service person using the internet, a selective call receiver (cell phone, pager, wireless PDA, and the like), email, or in some other manner, to notify the respective supplier that the specific Monitored News Rack 10 requires servicing as a seventh step Monitored News Rack 1064. The respective supplier would then service the Monitored News Rack 10 as an eighth step Monitored News Rack 1066. When the Service Person services the Monitored News Rack 10, the service person would cause a signal to be transmitted stating the Monitored News Rack 10 has been serviced. There are numerous unique process in which the service person utilizes to open the News Rack access door 20, triggering a switch on the inside of the Monitored News Rack 10, or any other means of providing a signal input to the News Rack monitoring system interface board and transmitter 34 to identify that the service person has provided service to the Monitored News Rack 10. The information may further be recorded at the receiver and decoding device, forwarded to the respective Single Copy Sales Manager, or the like, to provide a means to track the activities of each particular Monitored News Rack 10.

A preferred embodiment would be to receive the signal, decode the data transmission to determine the ESN and any encoded message, and transfer the information to a server on the Internet. Once the information is transferred to the server, the server would complete a reference look-up using the ESN to determine the physical location of the Monitored News Rack 10. The server would determine the pertinent time by either the time in which the information was received or the time stamp that is encoded within the transmission from the News Rack monitoring system interface board and transmitter 34. The server would complete a reference look-up using the encoded message to determine the status of the Monitored News Rack 10 that is to be conveyed to the Single Copy Sales Manager, Service Person, or other party. The information would be compiled into a database for demographic information, or any other useable information. The compiled information can be provided to the respective party such that the respective party may utilize the information to optimize the inventory management for each individual Monitored News Rack 10. One such means would be via an Internet web site.

Figure 13:
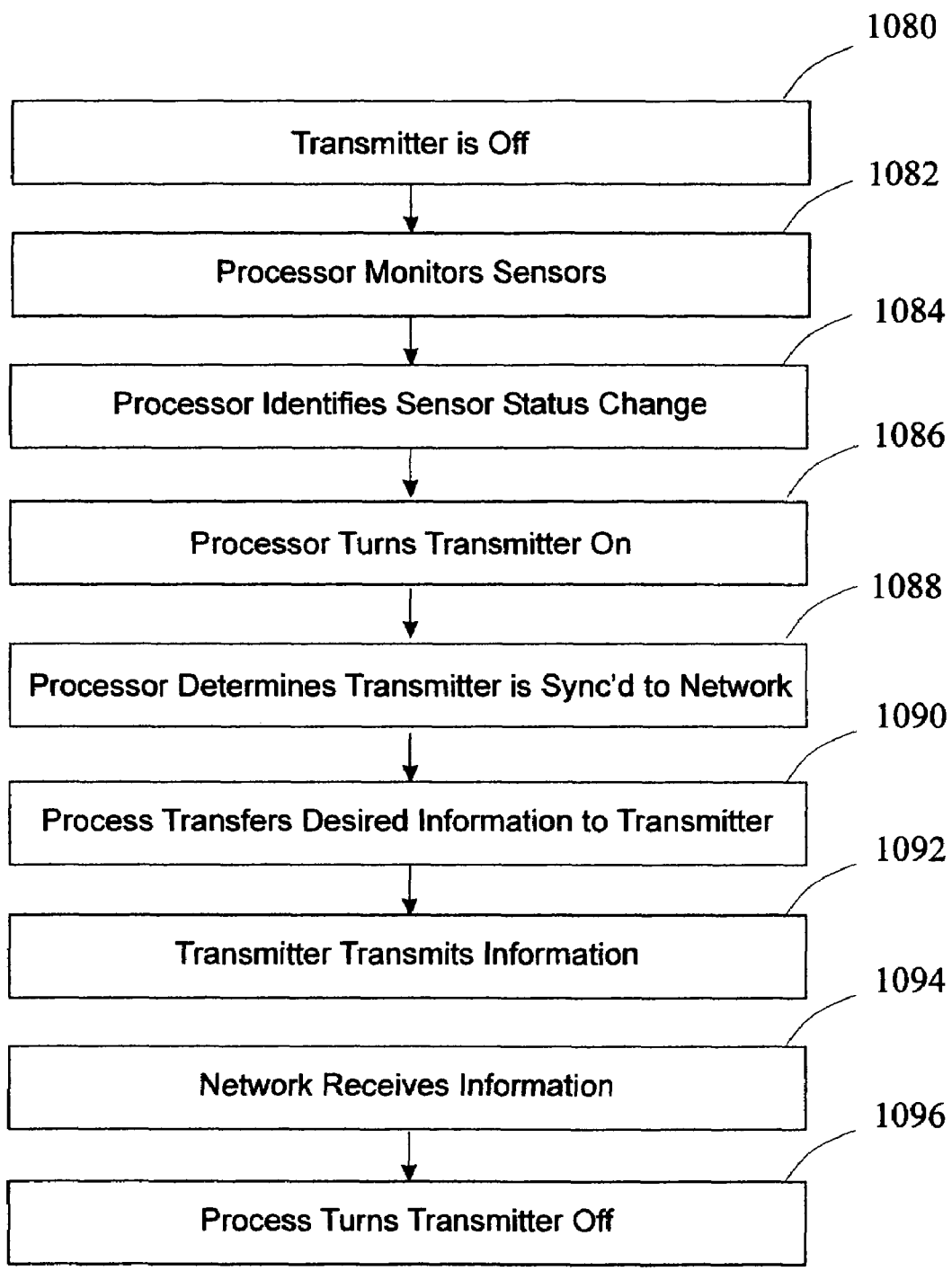
FIG. 13 is a flow chart diagram detailing the steps of remotely monitoring the inventory in conjunction with a power saving process.

FIG. 13 is a flow chart diagram that illustrates the steps of a power saving process. The transceiver is generally the largest power consumer within the circuit. It would be desirable to minimize the time in which the transceiver is on. The circuit would place the transceiver in the off position as a first step Monitored News Rack 1080. The circuit would monitor the at least one sensor for any change in state as a second step Monitored News Rack 1082. Such sensors can include, but not limited to an inventory sensor, a battery monitoring circuit, a tilt sensor, a service sensor, and the like. The circuit/processor would recognize a change in state/output of a sensor as a third step Monitored News Rack 1084. With the recognized change in state, the processor would turn the transceiver on as a fourth step Monitored News Rack 1086. The transceiver would synchronize with the network. The preferred embodiment would include a circuit that has some means to determine when the transceiver is synchronized with the wireless network as a fifth step Monitored News Rack 1088. The processor would transfer the respective information to the transceiver as a sixth step Monitored News Rack 1090. The transceiver would encode and transmit the respective information as a seventh step Monitored News Rack 1092. The receiver would receive the transmitted message as an eighth step Monitored News Rack 1094. The transceiver may wait for an acknowledgement from the receiver of receipt of the transmitted message. Should the transceiver not receive an acknowledgement, the transceiver can optionally retransmit the message. Once the processor determines that the message is transmitted (and optionally acknowledged), the processor can turn the transceiver off as an ninth step Monitored News Rack 1096. In general, processors draw News Rack access door 20 micro-amps, whereas the transceiver draws News Rack access door 20-50 milliamps. This controlled utilization of the transceiver provides significant power savings over the course of a battery charging cycle. A door status sensor 46 activated by motion of the door can be utilized to further reduce power consumption. The door status sensor 46 can be used to turn on other sensors/features within the News Rack.

Figure 14:
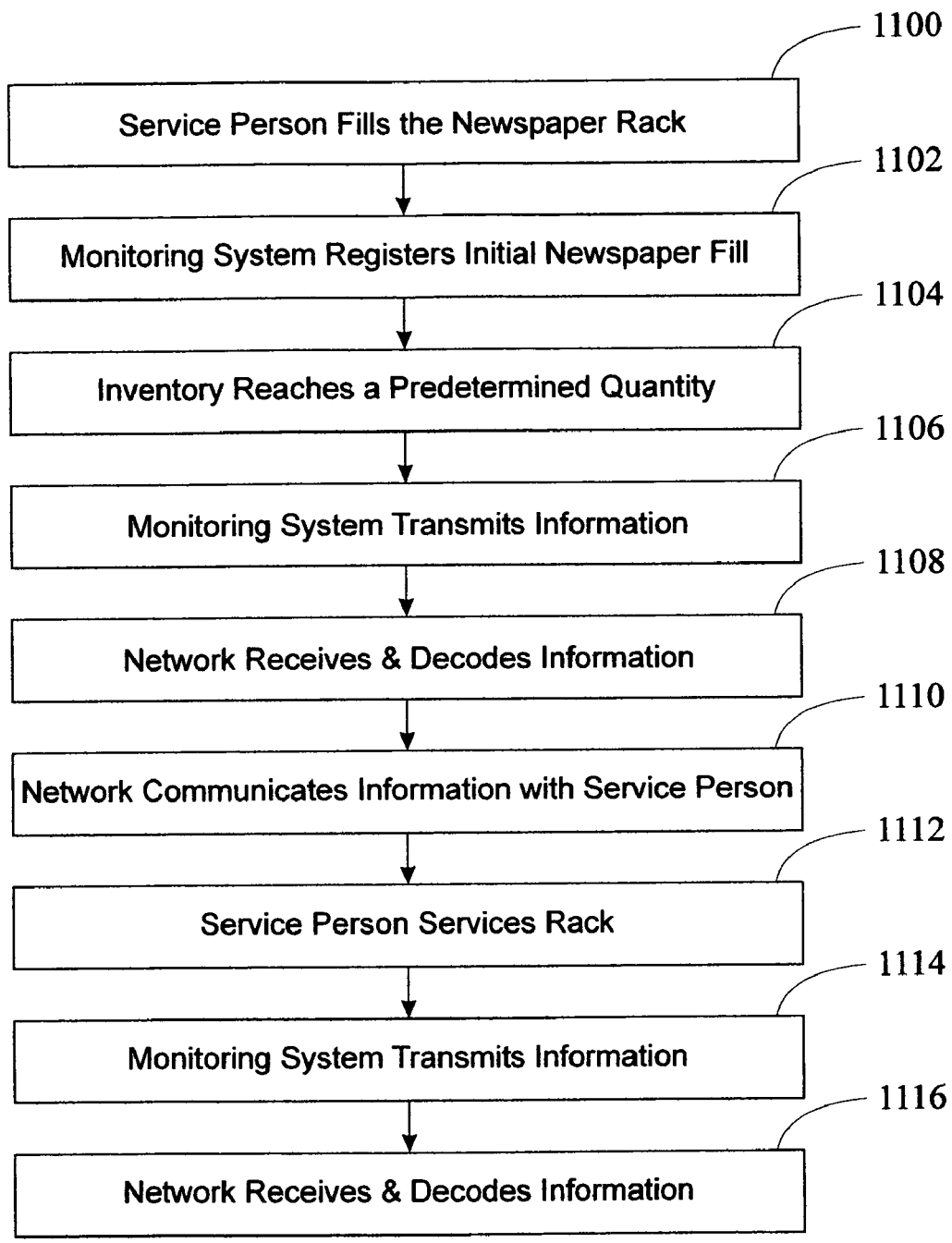
FIG. 14 is a flow chart diagram detailing the steps of managing deployed News Racks using a News Rack inventory management system.

FIG. 14 is a flow diagram representing the steps of managing a deployed fleet of News Racks by utilizing a remote monitoring system. The News Rack service person would open the News Rack access door 20 of the Monitored News Rack 10, remove any Newspaper(s) 99 remaining from the previous day/previous print and insert the current Newspaper(s) 99 with the Monitored News Rack 10 in a first step 1100. The inventory monitoring system within Monitored News Rack 10 recognizes the initial fill made by the service person respective to each Monitored News Rack 10 in a second step 1102. Consumers purchase Newspaper(s) 99 during the day/time period. The inventory monitoring system within Monitored News Rack 10 continues to monitor the quantity of Newspaper(s) 99 remaining in the Monitored News Rack 10. Once the quantity of Newspaper(s) 99 reaches a predetermined quantity as in step three 1104, the inventory monitoring system within Monitored News Rack 10 encodes a respective message and transmits the message using the News Rack monitoring system interface board and transmitter 34 to a system network receiver in a fourth step 1106. The system network receiver and software decodes the received message from the News Rack monitoring system interface board and transmitter 34 in the fifth step 1108. The system network software then compares the ESN of the decoded message to an index table to determine details respective to the specific News Rack monitoring system interface board and transmitter 34, such as where the specific News Rack monitoring system interface board and transmitter 34 is located, how to convey the message to the respective service person is, and the like. The base station (host) software can determine if it is desirable to replenish the Newspaper(s) 99 at a specific Monitored News Rack 10 based upon a predetermined time, historical sales data, and the like. The system determines if the current time is within the desired window for servicing of the Monitored News Rack 10. Should the current time be within the desired window for servicing of the Monitored News Rack 10, the network would communicate with the service person in the sixth step 1110. This can be accomplished by a variety of methods, including but not limited to text messaging to a cell phone, a pager, a wireless personal data assistant, email to the same, indirectly via email, internet webpage, and the like. The Service person can be one whose specific role would be to service the Monitored News Rack 10 between mid morning and early to mid afternoon. The service person travels to the respective Monitored News Rack 10 and services the Monitored News Rack 10 accordingly in a seventh step 1112. The inventory management system of Monitored News Rack 10 can monitor and recognize when the service person services the Monitored News Rack 10. Upon recognition of the service action, the News Rack monitoring system interface board and transmitter 34 would encode and transmit the respective information as an eighth step 1114. The network would receive and decode the transmitted information indicating the service person has serviced the rack as a ninth step.

Figure 15:
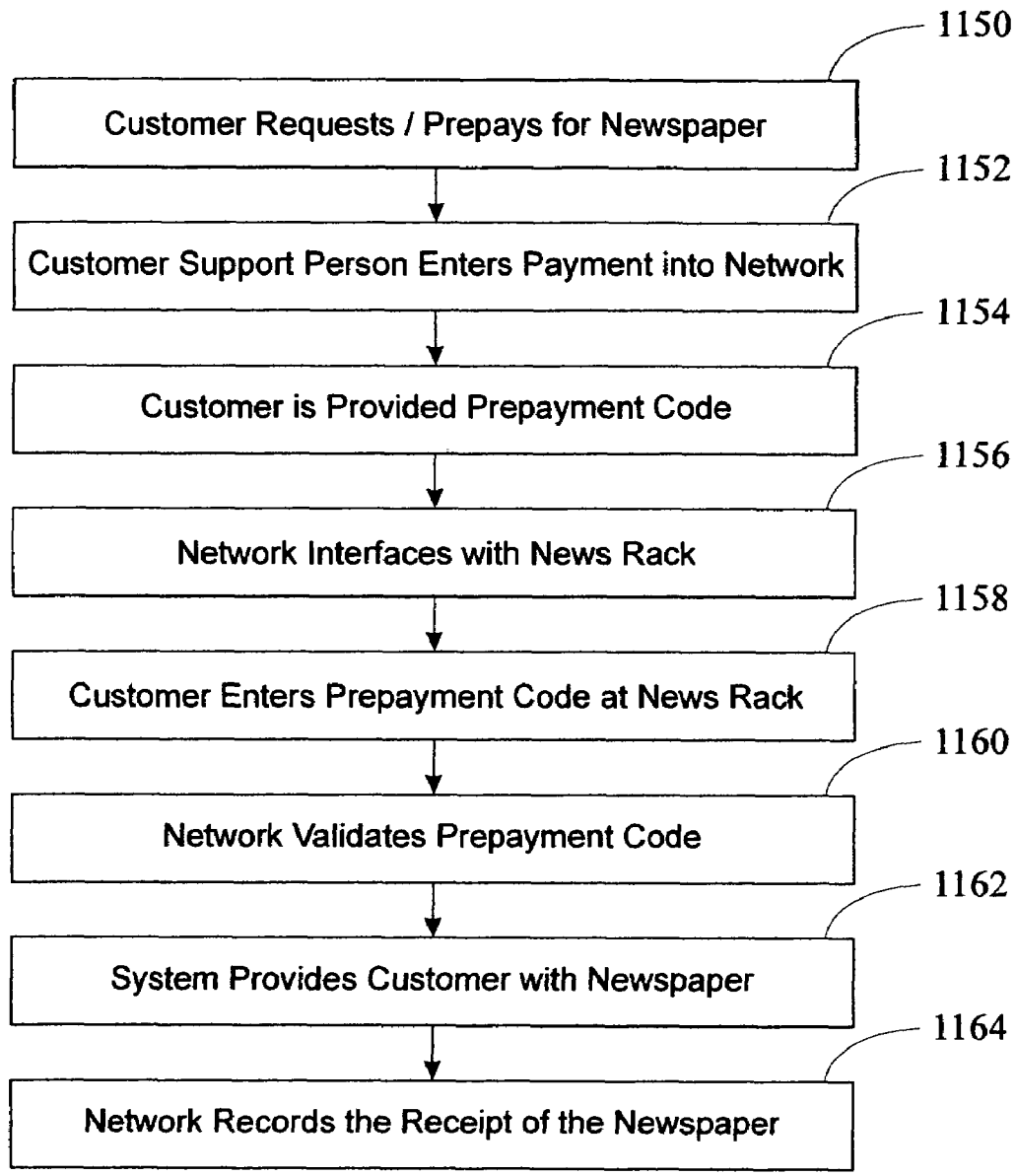
FIG. 15 is a flow chart diagram detailing the steps of a registered payment/prepayment/refund method.

FIG. 15 is a flow chart diagram describing the steps of a prepayment, bulk payment, and/or refund process. The Customer would request a Newspaper as a first step 1150. This can be a result of many options, including, but not limited to, a refund request, a prepayment, a promotion, a multi-paper purchase (generally discounted), a group purchase, and the like. The reason for purchase should not be considered a limitation respective to the spirit and intent of the invention described herein. Upon acceptance of the request made by the Customer, a Service Support Person would enter the respective information into the network in a second step 1154. The network would provide a prepayment access code that the Customer would use for purchase of a Newspaper at a later time as a third step 1156. The network can either maintain a database; transmit the information to a single or multiple News Racks, or both. The interface between the Network and the News Rack can occur at any point in time. The preferred embodiment would be wherein when the Customer enters the prepayment code (a fourth step 1158), the News Rack would communicate with the network to validate the prepayment code in a fifth step 1160. Once the system validates the prepayment code, the News Rack would allows the Customer to remove the Newspaper from the News Rack in a sixth step 1162. The network would then record the transaction in a seventh step 1164. Additionally, the system can provide a single access code for service persons. The code can be changed as desired. The code can further be of a time-limited basis, such as between 2 AM and 6 AM. The Service person can utilize the keyboard to enter other desirable information into the monitoring system, such as the number of Newspapers deposited at any time.

Figure 16:
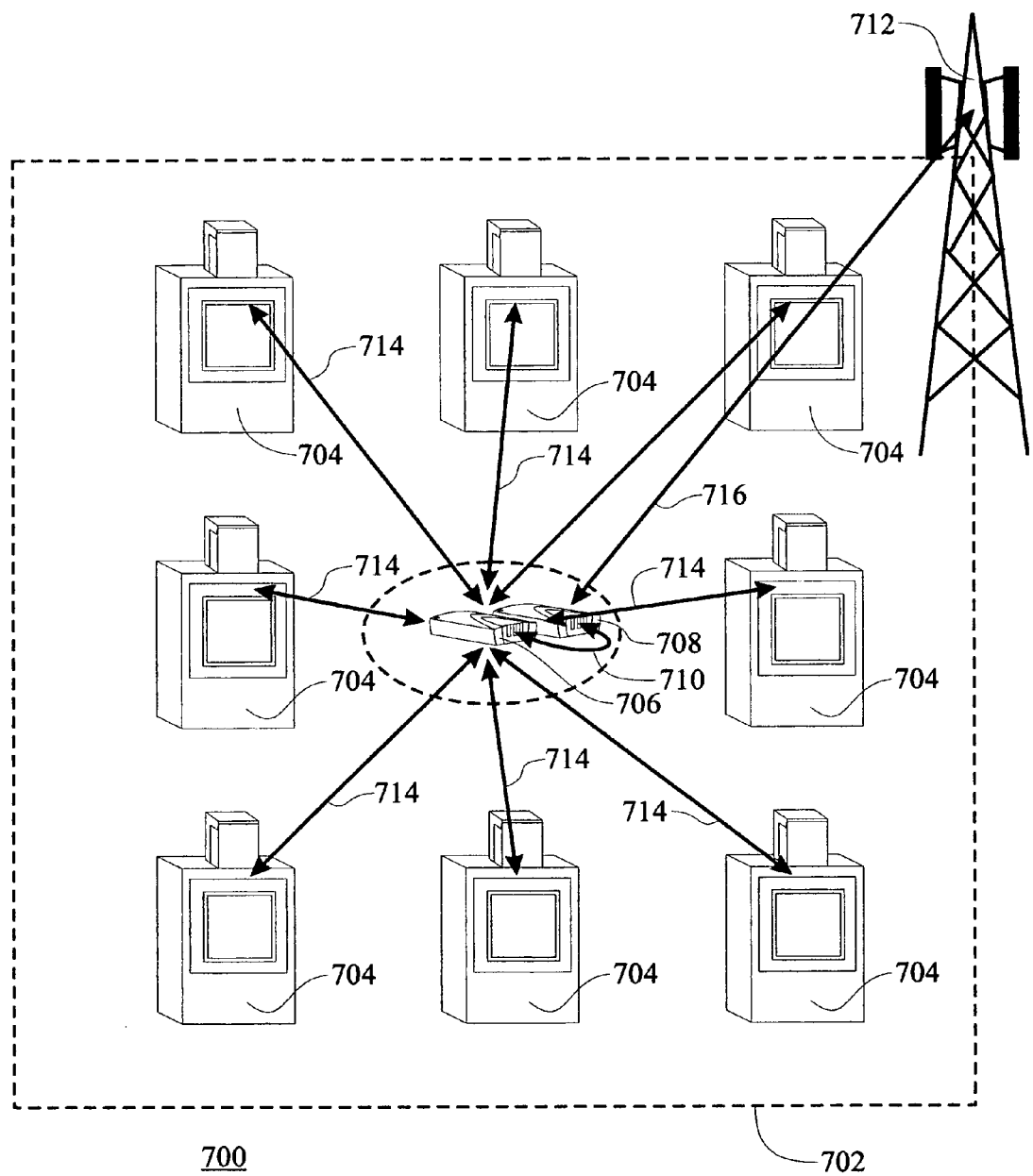
FIG. 16 is a representative diagram illustrating a news rack monitoring system utilizing a star network solution.

FIG. 16 presents a representative diagram illustrating a broad-based star network configuration 700 for monitoring a plurality of star networked Newsrack(s) 704 within a local star sub-network configuration 702. Each star networked Newsrack(s) 704 within said local star sub-network configuration 702 communicates with a local star network collector 706 via a star networked Newsrack to star collector communication(s) 714. Said communications can be accomplished using a transceiver preferably transmitting over an unlicensed frequency such as 900 MHz. In one application, a Radiotronix 250 mW radio is utilized as the transceiver. A similar unit is utilized in said local star network collector 706. Said local star network collector 706 uploads the local transmissions to a end recipient (not shown) by communicating to a mixed network link transceiver 708 via a star collector and link transceiver interface 710. Said mixed network link transceiver 708 is utilized to communicate between said local star sub-network configuration 702 and the end user via any of many known longer range communication means, such as cellular, paging, Internet, WiFi, trunking radio, dial modem, and the like. Said broad-based star network configuration 700 provides a plurality of star networked Newsrack(s) 704 to communicate to the end user via a ratio greater than one star networked Newsrack(s) 704 to a single uploading mixed network link transceiver 708. Said mixed network link transceiver 708 provides the information to the end user via a mixed network transceiver to long range interface transmission(s) 716. Said mixed network transceiver to long range interface transmission(s) 716 communicates with a broad based network receiver 712 which ultimately conveys the information to the end user via any of the many known devices and respective protocols. This configuration reduces the operational cost structure for the network by distributing the cost of operating said mixed network link transceiver 708 amongst multiple star networked Newsrack(s) 704. Effectively, instead of a 1:1 ratio, the network now has an N:1 ratio or an operating cost of approximately 1/N.

An example is provided in Table 1 representing a one month period. A cellular based monitoring network would cost the operator $2.75 per transmitter/rack. The operator would charge the customer a fee of $5.00 per transmitter/rack. The result is a $2.25 profit per rack. Conversely, a local network shares the central uploading transmitter cost. The resulting uploading transmitter cost increases slightly from $2.75 to $10 to accommodate the additional airtime used. The $10 fee is distributed amongst the number of racks deployed within the local network. With 1 rack, the per unit cost would be $10. With 200 racks, the per unit cost would be $0.05. With 500 racks, the per unit cost would be $0.02, or significantly less than the $2.75 per unit fee imposed using the cellular based solution. The end result is a lower ($3.00) fee per rack to the customer and an increase in profit to the operator.

TABLE 1

Operating Cost Comparison - Cellular Vs. Local Network

| No. of | Cellular | | | Local Network | | |
| --- | --- | --- | --- | --- | --- | --- |
| Units | Revenue | Cost | Profit | Revenue | Cost | Profit |
| 1 | $5 | $3 | $2 | $3 | $10 | −$7 |
| 10 | $50 | $28 | $23 | $30 | $10 | $20 |
| 20 | $100 | $55 | $45 | $60 | $10 | $50 |
| 50 | $250 | $138 | $113 | $150 | $10 | $140 |
| 100 | $500 | $275 | $225 | $300 | $10 | $290 |
| 200 | $1,000 | $550 | $450 | $600 | $10 | $590 |
| 500 | $2,500 | $1,375 | $1,125 | $1,500 | $10 | $1,490 |
| Per Unit | $5.00 | $2.75 | | $3.00 | $10.00 | |

The utilization of a broad-based star network configuration 700 significantly lowers the operating cost making the solution much more appealing to the customer.

Figure 17:
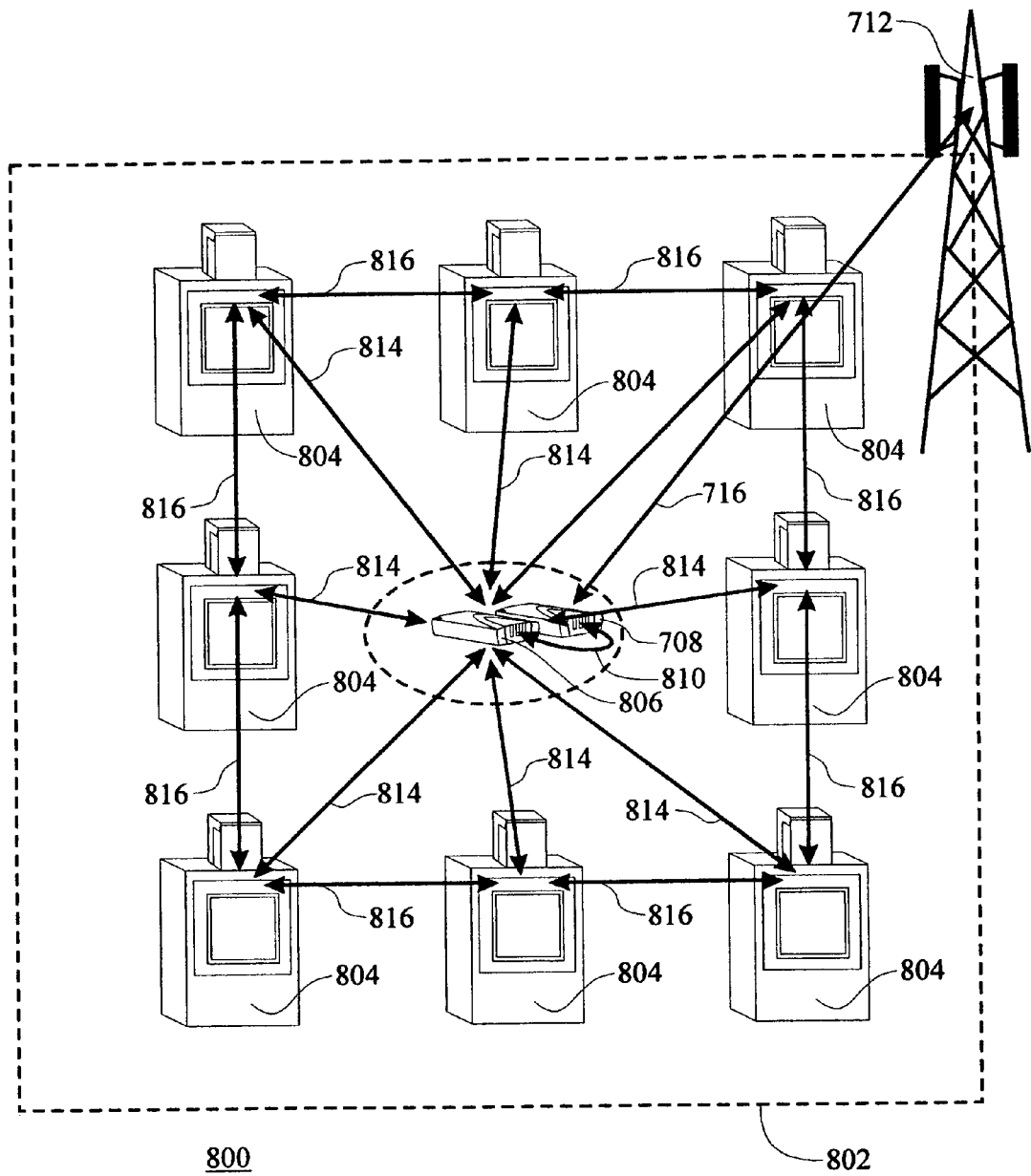
FIG. 17 is a representative diagram illustrating a news rack monitoring system utilizing a mesh network solution.

FIG. 17 presents a representative diagram illustrating a broad-based mesh network configuration 800 for monitoring a plurality of mesh networked Newsrack(s) 804 within a local mesh sub-network configuration(s) 802. Each mesh networked Newsrack(s) 804 within said local mesh sub-network configuration(s) 802 communicates with a local mesh network collector 806 via a mesh networked Newsrack to mesh collector communication(s) 814. Said communications can be accomplished using a transceiver preferably transmitting over an unlicensed frequency such as 900 MHz. In one application, a Radiotronix 250 mW radio is utilized as the transceiver. It is further enhanced with a frequency hopping software, allowing for more powerful, thus longer distance transmissions. In addition to said mesh networked Newsrack to mesh collector communication(s) 814, said local mesh sub-network configuration(s) 802 further comprising mesh networked Newsrack to mesh networked Newsrack communication(s) 816. This provides several unique capabilities over the star configuration:

a. By utilizing rack to rack transmissions (mesh networked Newsrack to mesh networked Newsrack communication(s) 816), one can increase the overall distance from a rack to said local mesh network collector 806.

b. Should a component within the network fail, the system is self healing, transmitting to a different transceiver.

c. Multiple local mesh network collector(s) 806 can be utilized within said local mesh sub-network configuration(s) 802

A unit similar to the radio incorporated within said mesh networked Newsrack(s) 804 is utilized in said local mesh network collector 806. Said local mesh network collector 806 uploads the local transmissions to a end recipient (not shown) by communicating to a mixed network link transceiver 708 via a mesh collector and link transceiver interface 810. Said mixed network link transceiver 708 is utilized to communicate between said local mesh sub-network configuration(s) 802 and the end user via any of many known longer range communication means, such as cellular, paging, Internet, WiFi, trunking radio, dial modem, and the like. Said broad-based mesh network configuration 800 provides a plurality of mesh networked Newsrack(s) 804 to communicate to the end user via a ratio greater than one mesh networked Newsrack(s) 804 to a single uploading mixed network link transceiver 708. Said mixed network link transceiver 708 provides the information to the end user via a mixed network transceiver to long range interface transmission(s) 716. Said mixed network transceiver to long range interface transmission(s) 716 communicates with a broad based network receiver 712 which ultimately conveys the information to the end user via any of the many known devices and respective protocols. This configuration reduces the operational cost structure for the network by distributing the cost of operating said mixed network link transceiver 708 amongst multiple mesh networked Newsrack(s) 804. Effectively, instead of a 1:1 ratio, the network now has an N:1 ratio or an operating cost of approximately 1/N.

Figure 18:
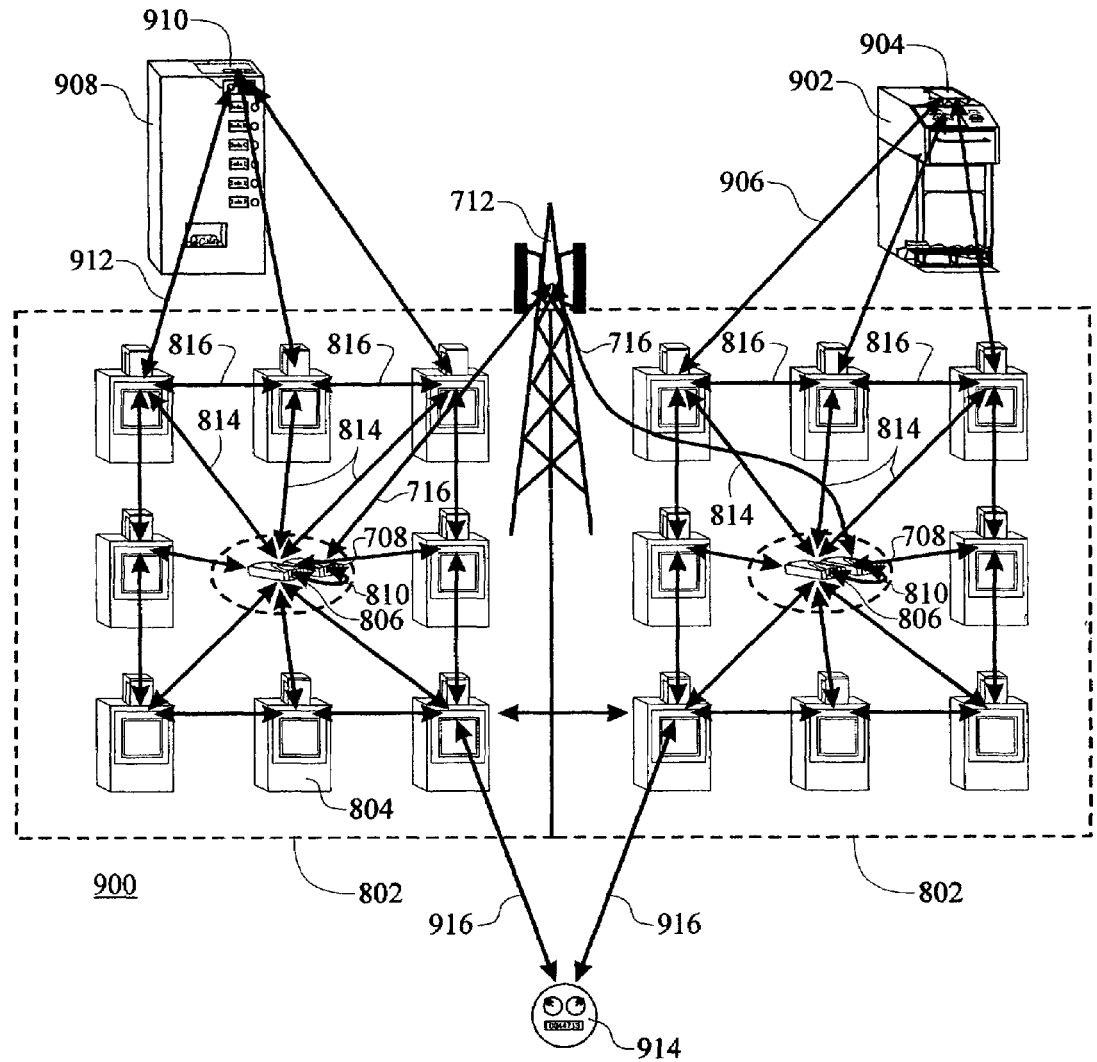
FIG. 18 is a representative diagram illustrating a news rack monitoring system utilizing multiple mesh network solutions and further incorporating non-newspaper racks into said network.

FIG. 18 presents the utilization of a plurality of local mesh sub-network configuration(s) 802 having the features described in FIG. 17 and introducing a multiple device monitoring mesh network 900. Said multiple device monitoring mesh network 900 utilizes a plurality of objects within a single mesh network. The inventors recognize the uniqueness provided by newspaper racks. Newspaper racks are located within close proximity to each other and provide for a well knit mesh network deployment. Mesh network transceivers can operate up to 12 miles, but can also be limited by the terrain, reducing the coverage to as little as ½ mile. Newspaper racks have the unique deployment of meeting the short distance. An alternate to the mesh networked Newsrack(s) 804 includes pay phones (not shown) and traffic monitoring systems. Alternatively, by combining mesh transceivers incorporated into various objects, one can create and operate a reliable mesh network.

A first example of a non-newspaper rack object is a mesh networked parcel drop box 902, said mesh networked parcel drop box 902 comprising a mesh networked parcel drop box transceiver 904 which communicates with said local mesh sub-network configuration(s) 802 via a mesh networked parcel drop box to mesh network Newsrack communication(s) 906.

A second example of a non-newspaper rack object is a mesh networked vending machine 908, said mesh networked vending machine 908 comprising a mesh networked vending machine transceiver 910 which communicates with said local mesh sub-network configuration(s) 802 via a mesh networked vending machine to mesh network Newsrack communications 912.

A third example of a non-newspaper rack object is a mesh network meter 914, said mesh network meter 914 comprising a mesh networked meter transceiver (not shown) which communicates with said local mesh sub-network configuration(s) 802 via a mesh network meter to mesh network Newsrack communication(s) 916. Such meters include, but not limited to, electric meters, water meters, gas meters, gas storage tanks, and the like.

It is recognized that although the inventor has disclosed three examples, the multiple device monitoring mesh network 900 can monitor any other device. The advantage to this innovation is the reduction of overall operating costs. Additionally, the operator of the network can increase profit, while reducing the fees to the clients. Should the newspaper company operate the network, this provides them with an alternate income source utilizing the unique deployment of their newspaper racks.

Figure 19:
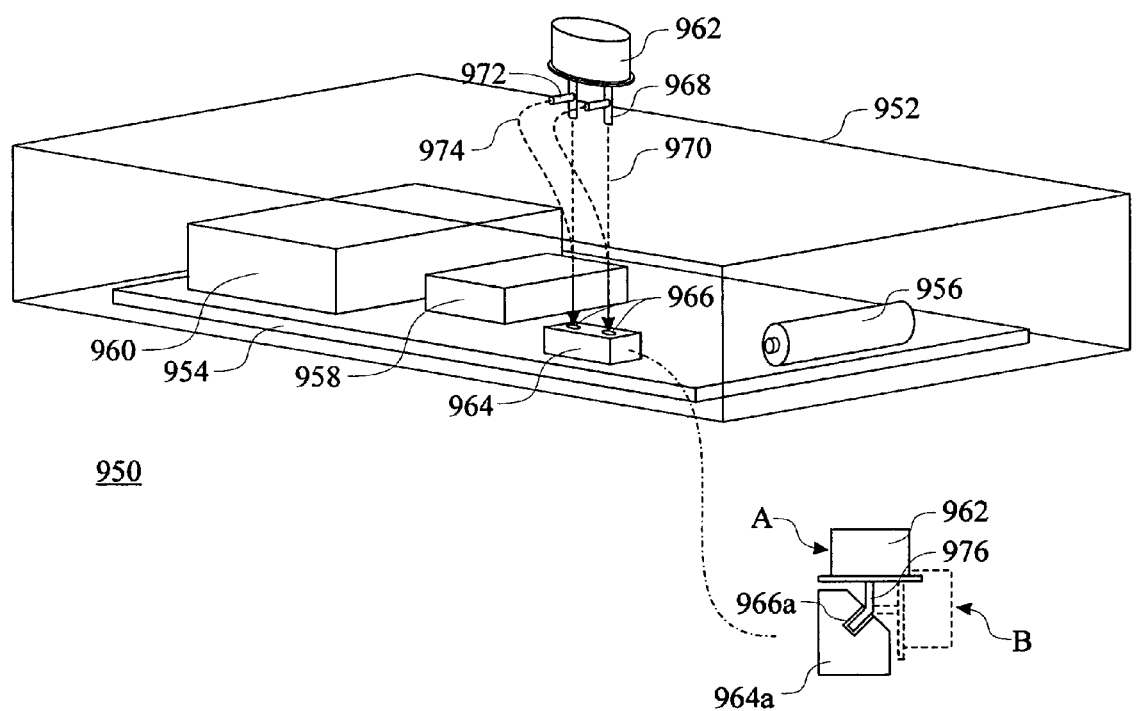
FIG. 19 is a representative diagram illustrating an antitheft device, further illustrating a multiple orientation sensor design.

FIG. 19 presents a representative diagram illustrating the primary components of a tilt monitoring apparatus 950. Said tilt monitoring apparatus 950 comprising a tilt monitoring enclosure 952, wherein said tilt monitoring enclosure 952 encases the components of said tilt monitoring apparatus 950 as well as providing a means for mounting of said tilt monitoring apparatus 950 to an object. Said means for mounting (not shown) can comprise any know means for coupling two objects, including bolting, screws, adhesive, brackets, and the like. Said disclosure presents the ability to mount said tilt monitoring apparatus 950 at various angles as described herein. Said tilt monitoring apparatus 950 further comprising a tilt monitoring printed circuit board 954 for optimally interfacing the various functioning components of said tilt monitoring apparatus 950, such as a tilt monitoring power source 956, a GPS receiver 958, and a tilt monitoring transceiver 960. A tilt sensor 962 can be either coupled directly to said tilt monitoring printed circuit board 954 or via a tilt sensor connector 964. The preferred embodiment would provide said tilt sensor 962 in a normally closed orientation, wherein should said tilt sensor 962 be removed, it would simulate a vandalism state. The disclosure teaches a multiple orientation version of said tilt sensor 962, wherein said tilt sensor 962 comprising a design and connector interface allowing said tilt sensor 962 to be applicable in multiple mounting orientations.

A first such tilt sensor 962 comprising a "T" shaped lead, wherein said "T" shaped lead comprising a tilt sensor vertical mount lead section 968 and a tilt sensor horizontal mount lead section 972. Said tilt sensor vertical mount lead section 968 couples said tilt sensor 962 positioned respective to said tilt monitoring printed circuit board 954 inserting said tilt sensor vertical mount lead section 968 in accordance with a tilt sensor vertical mount process 970 as shown. Said tilt sensor horizontal mount lead section 972 couples said tilt sensor 962 positioned respective to said tilt monitoring printed circuit board 954 inserting said tilt sensor horizontal mount lead section 972 in accordance with a tilt sensor horizontal mount process 974 as shown.

A second such tilt sensor 962 comprising a tilt sensor angled lead(s) 976, wherein said tilt sensor angled lead(s) 976 comprising a bend, preferably one that is 45 degrees, as shown in the sectional alternative illustration provided herein. Said tilt sensor 962 would be inserted into an alternate designed tilt sensor connector 964*a*, said tilt sensor connector 964*a* comprising an angled interface for receiving said tilt sensor angled lead(s) 976. When said tilt sensor angled lead(s) 976 are inserted into said tilt sensor connector electromechanical interface 966*a* in a first orientation, said tilt sensor 962 is oriented vertically as presented by solid vertical orientation A. When said tilt sensor angled lead(s) 976 are inserted into said tilt sensor connector electromechanical interface 966*a* in a second orientation, said tilt sensor 962 is oriented horizontally as presented by dashed horizontal orientation B.

When said tilt sensor 962 changes state, a monitoring circuit (not shown) initiates a notification process. Notification would be provided via wireless interface, said wireless interface can be either cellular, paging, mesh network, star network, VHF, Wi-Fi, and the like. Said notification process can include determining and providing GPS information respective to the location of the object. Said tilt sensor 962 can alternatively be an accelerometer.

Said tilt monitoring apparatus 950 would be coupled to normally stationary objects such as those described herein. Additionally, if the objects are moveable, said system can be programmed providing a window of time that said object should be stationary and when said object should be mobile. The programming can be accomplished locally or via said tilt monitoring transceiver 960. Alternately, a controlling switch can be incorporated, wherein said switch is operated by an acceptable representative. Alternatively, said tilt monitoring apparatus 950 can be programmed to determine if the object moves outside a predetermined area, sometimes referred to as a GPS fence. It is recognized that although the term GPS is used, any form of satellite location system can be used. Additionally, any type of radio triangulation system can be used.

It is recognized that the tilt monitoring apparatus 950 can be integrated with any other features presented herein.

It should be recognized that there are many options regarding how and where to place the various interfaces and the variations should not limit the spirit or intent of the present invention.

What is claimed:

1. A monitoring Newspaper Rack network, said Newspaper Rack network comprising:

a plurality of Newspaper Racks, each Newspaper Rack comprising:

a logic circuit, a stored power source, and a wireless transceiving circuit powered primarily by the stored power source, a communicating network provided wherein:

the wireless transceiving circuit of a first newspaper rack is in direct data communication with the wireless transceiving circuit of a second newspaper rack;

the wireless transceiving circuit of a second newspaper rack being in direct data communication with the wireless transceiving circuit of an nth newspaper rack;

the nth newspaper rack being in direct data communication with a network data transceiving collector; and wherein said transceiving circuit is at least one of a star network configuration, a mesh network configuration, and a frequency hopping network configuration operating on a license free, short range spectrum.

2. The monitored Newspaper Rack network of claim 1, wherein said Newspaper rack network further interfaces with a transceiving circuit located in an object other than the Newspaper Rack.

3. The monitored Newspaper Rack network of claim 2, wherein said object other than the Newspaper Rack is at least one of:
   a) vending machines,
   b) parcel drop boxes,
   c) electric meters,
   d) water meters,
   e) gas meters,
   f) gas storage tanks,
   g) alarm systems,
   h) parking meters, and
   i) traffic monitoring devices.

4. The monitored Newspaper Rack network of claim 3, wherein said network monitors at least one of:
   a) inventory of at least one vending machine,
   b) unwarranted motion of at least one vending machine,
   c) parcel deposition into at least one parcel drop box,
   d) unwarranted motion of at least one parcel drop box,
   e) current meter data of at least one electric meter,
   f) current meter data of at least one water meter,
   g) current meter data of at least one gas meter, and
   h) current gas balance of at least one gas storage tank.

5. The monitored Newspaper Rack network of claim 1, wherein said Newspaper Rack further comprising at least one sensor, wherein said at least one sensor monitors at least one of:
   a) tilt of the newspaper rack,
   b) unwarranted motion of the newspaper rack,
   c) battery status,
   d) newspaper inventory,
   e) coin mechanism,
   f) number of times a newspaper rack door opens, and
   g) newspaper rack door left open.

6. The monitored Newspaper Rack network of claim 2, the network providing a self healing process, wherein said self healing process comprising an acknowledge transmission step and wherein a transmitting transceiver fails to receive said acknowledge transmission, said transmitting transceiver comprising the ability to redirect said transmission from being directed toward a first transceiver to being directed toward a second transceiver.

7. A monitored Newspaper Rack, said Newspaper Rack comprising:
   a plurality of Newspaper Racks, each Newspaper Rack comprising:
      a logic circuit,
      at least one sensor,
      a stored power source, and
      a transceiving circuit powered primarily by the stored power source,
   wherein said transceiving circuit is at least one of a star network configuration, a mesh network configuration, and a frequency hopping network configuration
   a communicating network provided wherein:
      the wireless transceiving circuit of a first newspaper rack is in direct data communication with the wireless transceiving circuit of a second newspaper rack;
      the wireless transceiving circuit of a second newspaper rack being in direct data communication with the wireless transceiving circuit of an nth newspaper rack;
      the nth newspaper rack being in direct data communication with a network data transceiving collector;
      wherein the transceiving circuit operates on a license free, short range spectrum; and
   the newspaper rack further comprising at least one of:
      a) an inventory management sensor sensing a presence of a newspaper;
      b) an audio output device presenting audio data obtained via the communicating network,
      c) a visual output device presenting visual images generated from data obtained via the communicating network.

8. The monitored Newspaper Rack of claim 7, wherein said at least one sensor monitors at least one of:
   a) tilt of the newspaper rack,
   b) unwarranted motion of the newspaper rack,
   c) battery status,
   d) newspaper inventory,
   e) coin mechanism,
   f) number of times a newspaper rack door opens, and
   g) newspaper rack door left open.

9. The monitored Newspaper Rack of claim 7, wherein said Newspaper Rack is at least one of a vending type, honor rack and a storefront rack.

10. The monitored Newspaper Rack of claim 7, said Newspaper Rack further comprising a sensor located in at least one of:
    door paper holder,
    paper holder platform, and
    a position to indicate when a Newspaper Rack door is opened.

11. The monitored Newspaper Rack of claim 7, said Newspaper Rack further comprising a least one of a tilt sensor and an acceleration sensor, wherein the transceiving circuit transmits a notification indicating a potential vandalism.

12. The monitored Newspaper Rack of claim 7, said Newspaper Rack further comprising at least one of a circuit and software for providing data respective to each time a Newspaper Rack door is opened.

13. A monitoring network, said monitoring network comprising
    a plurality of Newspaper Racks, each Newspaper Rack comprising:
       a logic circuit,
       a stored power source, and
       a wireless transceiving circuit powered primarily by the stored power source,
       a communicating network provided wherein:
          the wireless transceiving circuit of a first newspaper rack is in direct data communication with the wireless transceiving circuit of a second newspaper rack,
          the wireless transceiving circuit of a second newspaper rack being in direct data communication with the wireless transceiving circuit of an nth newspaper rack;
    the nth newspaper rack being in direct data communication with a network data transceiving collector;
    a non-newspaper rack object comprising:
       a second object logic circuit, a second object stored power source, and a second object wireless transceiving circuit, wherein the second wireless transceiving circuit is in direct data communications with the wireless transceiving circuit of any of the newspaper racks, wherein said transceiving circuit is at least one of a star network configuration, a mesh network configuration, and a frequency hopping network configuration operating on a license free, short range spectrum.

14. The monitoring network of claim 13, wherein said non-newspaper rack object is at least one of:

a) a vending machine,
b) a parcel drop box,
c) an electric meter,
d) a water meter,
e) a gas meter,
f) a gas storage tank,
g) an alarm system,
h) a parking meter, and
i) a traffic monitoring device.

15. The monitoring network of claim 13, wherein said collector is interfaced to at least one of for uploading the information:

a) a cellular transmitter,
b) a paging transmitter,
c) an Internet connection,
d) a Wi-Fi connection, and
e) a dial up modem.

16. The monitoring network of claim 13, said monitoring network further comprising a notification system which at least one of directly and indirectly notifies a Service Person.

17. The monitoring network of claim 16, wherein said notification system utilizes at least one of:

a) a world wide web/internet access,
b) an internal network/intranet,
c) email,
d) a wireless selective call receiver,
e) a cellular phone,
f) a pager, and
g) a wireless personal data assistant.

18. The monitoring network of claim 13, the network providing a self healing process, wherein said self healing process comprising an acknowledge transmission step and wherein a transmitting transceiver fails to receive said acknowledge transmission, said transmitting transceiver comprising the ability to redirect said transmission from being directed toward a first transceiver to being directed toward a second transceiver.

19. The monitoring network of claim 13, wherein at least one of said at least one first monitored object and at least one second monitored object comprising at least one of:

a) tilt of said monitored object,
b) unwarranted motion of said monitored object,
c) status of said stored power source,
d) inventory status, and
e) vending mechanism status.

* * * * *